(12) United States Patent
McDermott et al.

(10) Patent No.: US 9,192,189 B1
(45) Date of Patent: Nov. 24, 2015

(54) BEVERAGE ICE AND RELATED METHODS

(71) Applicants: Martin John McDermott, Phoenix, AZ (US); William J. Roberts, Phoenix, AZ (US)

(72) Inventors: Martin John McDermott, Phoenix, AZ (US); William J. Roberts, Phoenix, AZ (US)

( * ) Notice: Subject to any disclaimer, the term of this patent is extended or adjusted under 35 U.S.C. 154(b) by 0 days.

(21) Appl. No.: 13/931,791

(22) Filed: Jun. 28, 2013

Related U.S. Application Data

(60) Provisional application No. 61/801,814, filed on Mar. 15, 2013.

(51) Int. Cl.
| | | |
|---|---|---|
| *A23L 2/00* | (2006.01) | |
| *A23L 2/52* | (2006.01) | |
| *A23L 1/00* | (2006.01) | |
| *A23G 9/48* | (2006.01) | |

(52) U.S. Cl.
CPC ............... *A23L 2/52* (2013.01); *A23L 1/0008* (2013.01); *A23G 9/48* (2013.01); *A23V 2250/2108* (2013.01)

(58) Field of Classification Search
USPC .................................................. 426/249, 66
IPC A23L 1/0008,1/3002; A23V 2250/2108; A23G 9/48
See application file for complete search history.

(56) References Cited

U.S. PATENT DOCUMENTS

| | | |
|---|---|---|
| 7,488,424 B2 | 2/2009 | Gruett et al. |
| 2007/0210105 A1 | 9/2007 | Malachowsky et al. |
| 2007/0271944 A1 | 11/2007 | Ryan et al. |
| 2011/0300264 A1 | 12/2011 | Neta et al. |
| 2012/0000217 A1 | 1/2012 | Gudnason |

FOREIGN PATENT DOCUMENTS

WO        WO97/06695       *  2/1997

OTHER PUBLICATIONS

Content, "Caffeine Anhydrous: What Is It?" pp. 1-2, Jan. 8, 2010, http://www.3fatchicks.com/caffeine-anhydrous-what-is-it/.*

* cited by examiner

*Primary Examiner* — Kelly Bekker
(74) *Attorney, Agent, or Firm* — Stephen T. Sullivan, P.C.

(57) ABSTRACT

Ice for use in a beverage, wherein the ice comprises a core, an active zone, an external surface, and caffeine. The ice particle has a depth from each point of the external surface extending perpendicularly inwards. It also has a total particle mass. The caffeine in the ice particle has a total caffeine mass, and the ice particle has an ice caffeine concentration equal to the total caffeine mass divided by the total particle mass. The active zone includes at least 40% of the total caffeine mass and local caffeine concentrations of at least 150% of the ice caffeine concentration. At least 67% of the total caffeine mass is contained within a caffeine depth in millimeters from the external surface no greater than 1.06 times the cube root of the total particle mass in grams. The core has local caffeine concentrations of less than 150% of the ice caffeine concentration.

25 Claims, 9 Drawing Sheets

(A)

(B)

BEVERAGE ICE AND RELATED METHODS

The present application is a continuation application of and claims the benefit of U.S. provisional application Ser. No. 60/801,814, filed Mar. 15, 2013, entitled "Beverage Ice and Related Method," which application is incorporated herein by reference in its entirety as if fully set forth herein and for all purposes.

BACKGROUND OF THE INVENTION

1. Field of the Invention

The invention relates to ice for use in beverages, and related methods for making and using such ice. More specifically, the invention relates to ice for use in cooling beverages wherein one wishes to include caffeine, and related methods for making and using such ice.

2. Description of the Related Art

The use of ice, i.e., water in its frozen or solid state, for cooling beverages of course is extremely well known. Commercially-available beverage ice is usually manufactured, typically in ice making machines, and thus controls can be exercised regarding purity, geometry or shape, texture and the like. Beverage ice comes in a variety of geometric shapes or forms. Some of the more popular varieties include square-faced or cubic, rectangular-faced or cuboid, spherical, hemispherical, crescent-shaped, tubular, flaked or crushed ice, and others.

It is common in public beverage serving establishments to fill a beverage glass with ice, and then to pour the beverage components (a soft drink, liquor components, mixers, etc.) into it on top of the ice. Typically, the ice is added up to the top rim of the glass, and the beverage component or components are added, either in specific, measured amounts or in approximate amounts by visual inspection. In some instances, a remaining volume of the glass is filled with a mixer, such as water, soda, juice, etc. There are also instances where a lesser amount of ice is used, such as an amount that would be sufficient to fill only about a third or half of the beverage glass, and instances where a beverage is first poured into a glass and ice is then added. The liquid beverage components, which may be referred to simply as "beverage," often are at ambient temperature when dispensed into the glass. Thus, some melting of the ice occurs promptly, and the process of heat transfer and melting then occurs. Stirring or agitation may be used to modify and enhance the process.

The usual function of beverage ice of course is to cool the beverage. The ice is colder than the beverage, and when the beverage and ice are combined, heat from the beverage is absorbed by the ice, thus reducing the temperature of the beverage. It should be noted that the ice initially may be at a temperature below its melting or fusion temperature. For pure water at atmospheric pressure, the melting point or fusion temperature is 0° centigrade ("C") or 32° Fahrenheit ("F"). The ice may, however, be cooled below this point. As is well known in such fields as physical chemistry and thermodynamics, for ice below its fusion temperature, as heat is added, the temperature of the ice will increase in inverse proportion to its heat capacity or specific heat. For pure water at standard temperature and pressure, the specific heat capacity is 1.00 calories per gram-degree centigrade (cal/g/° C.). For ice consisting of pure water at atmospheric pressure, the specific heat is 0.50 cal/g/° C. That is, if one calorie of thermal energy is inputted into one gram of ice, this input will cause the temperature of the ice to rise by 0.50° C. As additional heat is slowly added, the temperature of the ice will rise until it reaches the melting point or fusion temperature of 0° C. (32° F.). At this fusion temperature, the addition of further thermal energy will not cause the temperature of the ice to rise, but instead will cause it to transition from solid state to liquid state, i.e., to change its phase from solid to liquid, or melt.

In the context of ice in a beverage, upon mixing, the beverage is usually at a temperature that is higher than that of the ice. Thus, given that heat is transferred from higher temperature regions to lower temperature regions, heat in the beverage is transferred across the solid-liquid boundary at the surface of the ice and into the body of the ice, i.e., the bulk ice. This heat transfer process causes the temperature of the beverage to decrease and the temperature of the ice to increase substantially without melting until the fusion temperature of the ice is reached at its surface. At that temperature, the additional heat transferred from the beverage to the ice causes the surface of the ice to melt. Because the associated heat of fusion is 80 cal/g/° C., the melting of ice absorbs 80 calories ("cal") of heat energy from the surrounding beverage for each gram ("g") of ice melted. As a result, the principal part of the cooling effect of beverage ice derives from melting. This melted ice, or liquid water, is then physically diffused or convected away from the ice surface and into the bulk liquid of the beverage.

When a room temperature beverage and ice are mixed, the amount of ice melted during the "initial cooling phase," defined herein as the cooling of the beverage from its initial temperature to about 40° F. (4.4° C.), will vary somewhat according to several factors. These factors include the temperature of the beverage when poured and the starting temperature of the ice. Another cause for variation is that cooling of an alcoholic beverage can require the melting of up to about 13% less ice than would be required with a non-alcoholic beverage due to reduced specific heat capacity resulting from the alcohol content. As a general approximation, however, for each gram of beverage that is cooled in the initial cooling phase, about 0.20 to 0.26 grams of ice melt. These amounts result from the above-described thermodynamic phenomena.

A beverage might be cooled with the exact amount of ice that, on complete melting, would cool the beverage to the desired drinking temperature. In most instances that amount would be similar per gram of beverage to the values given above. Ordinarily, however, a greater amount of ice than this is used, e.g., about 0.5 to about 1.5 grams of ice per gram of beverage. Amounts of ice such as these can provide faster cooling, a reserve cooling capacity to keep the beverage cool during the period of drinking even as some heat is absorbed from the environment, and there is typically economic advantage to a proprietor compared to minimal use of ice, since for a given beverage container size less beverage needs to be dispensed to fill the container. Personal preference could be another reason for such use.

Caffeine is a well-known and widely-used chemical, often used or consumed in beverages. It functions as a stimulant to the central nervous system. Short term effects include increased energy and alertness, which many find to be desirable or advantageous.

In caffeine-containing beverages caffeine concentrations are ordinarily in the range of about 2.8 to 5.9 milligrams ("mg") per fluid ounce ("oz") (mg/oz) of beverage for carbonated soft drinks, about 10 to 17 mg/oz for non-espresso coffee, about 3.8 to 7.5 mg/oz for teas, and about 9.4 to 16 mg/oz for typical eight-ounce energy drinks. A minimal advantageous dose that may be consumed at one occasion can be considered to be about 23 mg, corresponding to 8 ounces of a caffeinated soft drink such as Coca-Cola®. More commonly, however, those wishing to enjoy the advantages of caffeine typically consume about 50 to 100 mg of caffeine per serving, and when consuming more than one serving, from about 50 to about 250 mg of caffeine at an occasion. The maximum safe amount of caffeine consumed at one occasion is widely considered to be about 300 mg. In terms of concentration of caffeine in a beverage, the Food and Drug Administration has determined that caffeine may be used safely in beverages at concentrations of up to 0.02%.

Typically, for those who wish to consume a caffeine-containing beverage, they select a beverage that has the caffeine already included or incorporated into the beverage. A coffee drink would be an example. The caffeine is a component of the coffee bean from which the coffee beverage is made, and caffeine therefore is inherently incorporated into the beverage from the outset. Energy drinks provide additional examples, wherein caffeine is inherently included in the beverage, or is added during the beverage manufacturing process.

Alternatively, a non-caffeine-containing beverage may be converted to a caffeine-containing beverage, or the amount of caffeine already present in a beverage may be increased, simply by adding caffeine. The caffeine may be in solid form, e.g., such as a powder, a tablet, a capsule, etc. Chocolate, for example, usually contains caffeine, and could be dissolved into a beverage as a caffeine-providing component. The caffeine also may be in liquid form, typically contained in a solution. Adding a caffeine-containing energy drink to a non-caffeine-containing beverage would be an example. To illustrate, one may wish to add a small amount of energy drink to an alcoholic beverage to enjoy the benefits of the caffeine while enjoying the beverage.

This general approach of adding caffeine to a preexisting beverage at or near the point of consumption, however, can be disadvantageous in a number of respects. It is necessary, for example, for the caffeine component to be made physically present and available at the point of addition. If the addition is to occur in a restaurant, bar, lounge or other public establishment where drinks are served, for example, the caffeine component must be procured and maintained as a separate item of inventory. Caffeine is not generally available on a small scale for use as a beverage additive in a non-industrial setting. Further, addition of caffeine in the most commonly-produced pure form, which is powdered or crystalline, generally requires stirring for full dissolution to occur, and even then dissolution may be slow. In the context of professional establishments serving beverages, it is generally impractical for servers to spend more than a threshold minimum amount of time to prepare a beverage. For example, even 30 seconds of added preparation time in many cases is commercially unacceptable, and in nearly all cases disadvantageous.

Another disadvantage of adding caffeine powder to a beverage is that in many instances, beverages are carbonated or include a carbonated component such as a cola soda or tonic water. Carbon dioxide gas is dissolved in the liquid. The addition of caffeine powder to such a beverage provides seed or nucleation particles, which cause the dissolved gas to become less soluble and be released from the liquid phase. This results in sudden fizzing and significant loss of carbonation.

Yet another disadvantage of direct addition of caffeine involves safety and health. Concerns have been raised recently about excessive doses of caffeine in beverages. Indeed, deaths are presently being attributed by some to energy drinks containing large amounts of caffeine. A common guideline is that nutritional supplements, inclusive of energy drinks, should not contain more than 300 mg of caffeine per serving. Another guideline is that, in beverages, the caffeine concentration should be no greater than 0.02%.

Where caffeine itself can be added to a beverage, it is possible, whether by error or intention, for larger amounts of caffeine to be added than would be healthy or safe.

In some instances, caffeine-containing beverages have been frozen. Caffeine-containing colas, for example, have been frozen to yield a frozen slush or solid ice that contains the caffeine from the cola. In such instances, however, the caffeine is dispersed homogeneously within the ice cubes or particles. Some caffeine is delivered, but much of it remains in the unmelted ice left in the container after the beverage has been consumed. In the example described herein above, that could include about 50% or more of the caffeine initially in the cola. Generally, such ice essentially acts as a frozen beverage source which, on melting, provides the same beverage in liquid form. In some instances, ice used to cool a beverage has comprised a frozen caffeine beverage or aqueous caffeine solution and has provided caffeine to beverages in the melting process. For example, a caffeine-containing soft drink such as Coca-Cola® or a relatively more concentrated aqueous caffeine solution could be frozen into ice cubes without employing features of the invention. If such ice cubes are mixed with a beverage and the beverage cooled by them, some caffeine is released into the beverage according to the proportion of such ice that melts. Such ice, if used to cool a beverage, would in most cases release into the beverage within the first few minutes of drinking only from about 15%-50% of the contained caffeine. If the caffeine amount released by such ice in the first few minutes of drinking were a desired amount, then with further melting while drinking the beverage, the amount of caffeine consumed could exceed the desired amount by a large factor, even by five times. Such a wide potential variation in caffeine delivery could present a health risk in some cases, and is disadvantageous in nearly all cases. Accordingly, there is a need for means to provide a controlled, desired amount of caffeine for a broad range of instances of drinking a beverage where it is desired to add caffeine to the beverage.

SUMMARY OF THE INVENTION

To address or overcome disadvantages and limitations such as those noted herein above, and in accordance with the purposes of the invention as embodied and broadly described in this document, ice is provided for use in a beverage. The ice comprises an ice particle, and may be provided as a plurality of ice particles. Each ice particle comprises a core, an active zone, an external surface, and caffeine. Each ice particle has a depth from each point of the external surface extending perpendicularly inwards. Each ice particle comprises a total particle mass, the caffeine in the ice particle comprises a total caffeine mass, and the ice particle has an ice caffeine concentration equal to the total caffeine mass divided by the total particle mass. The active zone comprises at least 40% of the total caffeine mass and local caffeine concentrations of at least 150% of the ice caffeine concentration. At least 67% of the total caffeine mass is contained within a caffeine depth in millimeters from the external surface no greater than 1.06 times the cube root of the total particle mass in grams. The core has local caffeine concentrations of less than 150% of the ice caffeine concentration.

In presently preferred embodiments according to this aspect of the invention, as a result of the spatial arrangement and composition of the active zone, during the initial cooling phase most or all of the active zone melts and most or all of the caffeine in the ice is released into the beverage during the normal or typical time in which the beverage is consumed.

The core comprises all frozen aqueous solutions or portions of the ice particle that have a local caffeine concentration less than 150% the ice caffeine concentration.

The ice caffeine concentration is between 0.05 and 10 milligrams per gram of ice mass (mg/g), and in many presently preferred embodiments is between 0.1 and 1 mg/g.

While the invention is not limited to the following limitations, preferred embodiments of it include those where the ice consists of or consists essentially of from about 2.5 to about 35 mg, and more preferably from about 4.0 to about 16 mg, of caffeine per ounce of beverage with which it is to be mixed. For each ounce of beverage, the amount of ice to be mixed with the beverage is typically from about 14 to about 42 grams, but is not limited to this range.

Where caffeine is provided by means of beverage ice according to aspects of the present invention, the serving establishment may control the amount of caffeine that is provided, and in particular, as a beverage container cannot be more than filled with such ice, a greater dose of caffeine than contained within such amount of ice cannot be provided whether by intention or error.

In accordance with another aspect of the invention, a method is provided for dispensing caffeine into a beverage within a container. The method comprises providing ice into the container, wherein the ice comprises an ice particle comprising a core, an active zone, an external surface, and caffeine, wherein the ice particle has a depth from each point on the external surface extending perpendicularly inwards. The ice particle has a total particle mass, the caffeine in the ice particle comprises a total caffeine mass, and the ice particle has an ice caffeine concentration equal to the total caffeine mass divided by the total particle mass. According to this method, the active zone comprises at least 40% of the total caffeine mass and local caffeine concentrations of at least 150% of the ice caffeine concentration, at least 67% of the total caffeine mass is contained within a caffeine depth in millimeters from the external surface no greater than 1.06 times the cube root of the total particle mass in grams, and the core has local caffeine concentrations less than 150% the ice caffeine concentration. The method further comprises contacting the ice and the beverage with one another within the container so that the ice undergoes melting and at least a portion of the caffeine is dispensed into the beverage as the melting occurs.

In accordance with another aspect of the invention, a method is provided for making beverage ice. The method comprises providing a first aqueous solution optionally comprising caffeine in a first concentration, providing a second aqueous solution different from the first aqueous solution comprising caffeine and having a caffeine concentration of at least 0.4 milligrams of caffeine per gram of the second solution and of at least twice the first concentration, and alternately providing the first and second aqueous solutions at a freezing location and freezing the first and second aqueous solutions to form ice, wherein the ice comprises an external surface and caffeine. According to this method, at least 67% of the caffeine in the ice is within a depth in millimeters from the ice external surface no greater than 1.06 times the cube root of the ice mass in grams, and the amount of the caffeine in the ice is at least 0.05 mg of caffeine per gram of the ice.

In accordance with another aspect of the invention, a method is provided for making beverage ice, wherein the method comprises providing an ice core, and providing to the core an aqueous caffeine-containing solution, having a caffeine concentration of at least twice the caffeine concentration of the core. The method further comprises disposing the aqueous caffeine-containing solution onto the core and to freeze onto the core to form ice comprising an external surface and caffeine. According to this method, at least 67% of the caffeine in the ice is within a depth in millimeters from the ice external surface no greater than 1.06 times the cube root of the ice mass in grams, and the amount of the caffeine in the ice is at least 0.05 mg of caffeine per gram of the ice.

In this method, the disposing of the aqueous caffeine-containing solution onto the core to form ice may comprise flowing the aqueous caffeine-containing solution onto the core, spraying the aqueous caffeine-containing solution onto the core, and causing the aqueous caffeine-containing solution to freeze onto the core.

In accordance with still another aspect of the invention, a method is provided for making beverage ice, wherein the method comprises providing an ice core, and providing a first aqueous caffeine-containing solution having a first caffeine concentration and a second aqueous caffeine-containing solution having a second caffeine concentration different from the first caffeine concentration. The method also comprises causing the first aqueous caffeine-containing solution to freeze onto the core to provide a first layer in the absence of the second aqueous caffeine-containing solution, and causing the second aqueous caffeine-containing solution to freeze onto the first layer to provide a second layer.

Accordingly, the presently preferred embodiments and method implementations provide caffeine to beverages in a controlled manner accommodating any of these varied relative amounts of ice used per serving.

By employing features of the invention according to its various aspects, the ice may, in the initial cooling phase, provide caffeine to a beverage in amounts or concentrations in accordance with the values described herein, while avoiding excessive caffeine delivery after the initial cooling phase. Optionally, it may provide essentially no further caffeine after the initial cooling phase.

Additional features and advantages of the invention will be set forth in the description which follows, and in part will be apparent from the description, or may be learned by practice of the invention. Features and advantages of the invention may be realized and obtained by means of the instrumentalities and combinations pointed out in the appended claims.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention. The drawings are not necessarily to scale. Of these drawings.

DETAILED DESCRIPTION OF THE PREFERRED EMBODIMENTS AND METHODS

Figure 1:
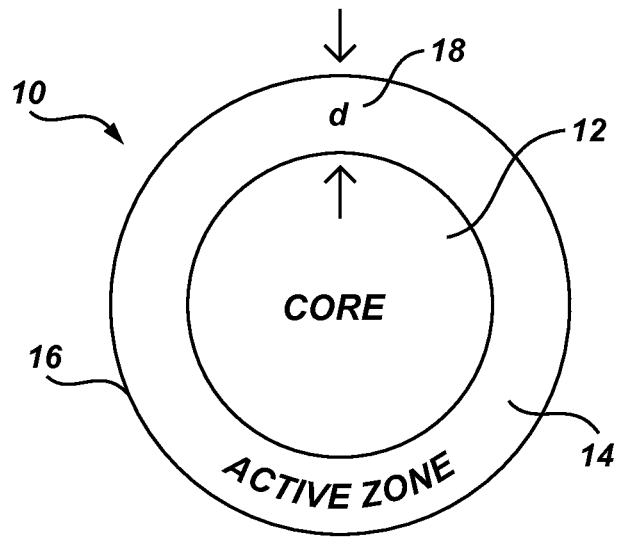
FIG. 1 shows a cross sectional view of a spherical ice particle according to a presently preferred embodiment of one aspect of the invention, and which illustrates principles of other aspects of the invention.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

In accordance with one aspect of the invention, ice is provided for use in a beverage. The "ice" may comprise one or a plurality of ice particles or ice "cubes" that are used together in the beverage both to cool the beverage and to deliver caffeine, preferably according to a pre-determined delivery scenario as described herein. Although the term "cube," read literally, implies that the ice particle has a three-dimensional, square-sided box shape with equal-sized faces, such strict literal meaning is not normally adopted in common usage, nor is it intended to be thus limited as regards the invention. An ice "cube" as used herein therefore may comprise such square-faced ice cubes, but also may comprise ice particles with other geometries, such as those with rectangular faces (cuboids), spheres, hemispheres, crescents, cylinders, tubular shapes or other curved faces, and the like. The ice particles also may comprise more irregular shapes, e.g., such as ice flakes or "crushed" or "shaved" ice.

It should be noted that, although the ice cubes or particles according to this aspect of the invention embody certain features of the invention as described herein, and in typical practice of the invention a plurality of such ice cubes or particles will be used in a given application, e.g., in a given beverage, it is possible for other ice cubes or particles that do not embody features of the invention to be included as well. In other words, it is possible to use mixtures of ice cubes according to the invention and ice cubes of conventional composition. Unless otherwise specifically pointed out, reference herein to "ice," "ice cubes," "ice particles" and the like refer to the cubes or particles that embody features of the invention, and not to ice cubes or particles that do not embody them.

Ice particles (also referred to as "ice") each comprise frozen aqueous solutions and caffeine, the amount of which may be expressed in milligrams inclusive of amounts smaller than one milligram. Further, ice particles each entirely comprise an active zone and a core which are frozen together, and comprise an ice mass which is the total mass of the ice particle and which may be expressed in grams inclusive of amounts less than one gram.

As the ice is formed, frozen aqueous solutions are produced from aqueous solutions which comprise potable source water and also comprise any solutes present. In some embodiments suspended particles may be present. The term "solution" as used herein, while used according to its common but broad meaning in the field, is not to be interpreted herein to exclude suspensions. The term "solute" as used herein also is used according to its broad but common meaning in the field, and includes molecules or fine suspended particles. Where caffeine is contained in an aqueous solution used to form ice, the resulting frozen aqueous solution comprises caffeine. Each ice particle according to this aspect of the invention may be formed either from at least two differing aqueous solutions or from a flow of aqueous solution varying over the duration of flow in solute content, yielding frozen aqueous solutions differing in their solute content.

The term "local caffeine concentration" is used herein according to its broad but common meaning within the chemical arts, e.g., to mean the mass of caffeine solute per mass of solution immediately about each point within the ice. The local caffeine concentration is a consequence of the caffeine concentration of the aqueous solution forming the ice in each such volume about each such point. Local caffeine concentration corresponds to and may be approximated or measured as the caffeine concentration of the aqueous solution forming the ice about each such point, as small differences in caffeine concentration occurring in practice between the liquid and frozen states do not materially change the function of the ice. The local caffeine concentration about any point optionally may be measured after formation of the ice, but determination according to the concentration of the aqueous solution forming the ice about any such point is preferred.

Ice particles also each comprise an ice caffeine concentration, which is the mass of caffeine contained in the ice particle divided by the ice mass, and which may be expressed in mg/g.

Ice particles also each comprise an ice external surface, which is all the surface of the ice particle that is not enclosed by frozen aqueous solution of the ice particle. The ice external surface defines the external boundaries of and contains the ice particle. Where an ice particle has one or more passages through it, as with torus-shaped ice or tube-shaped ice with a central passage, the surface of the passage is part of the ice external surface.

Still further, ice particles each comprise a depth from each point of the ice external surface extending perpendicularly inwards.

The active zone of each ice particle comprises at least 40% of the caffeine of the ice particle, and comprises all of the frozen aqueous solution of the ice particle which has a local caffeine concentration of at least 150% the ice caffeine concentration.

The active zone further comprises all points and microscopic volumes within it, wherein each point comprises a depth extending from the nearest point of the ice external surface to that point, and comprises an active zone maximum depth which is the greatest such depth.

The active zone also comprises an active zone mass, which is the mass of the active zone, and may be expressed in units of grams. The active zone also comprises an active zone caffeine concentration, which is the mass of the caffeine contained in the active zone divided by the active zone mass, and which may be expressed in units of mg/g.

The core comprises all frozen portions of the ice particle that have a local caffeine concentration less than 150% of the ice caffeine concentration. Where the frozen aqueous solution or material about a point within the core has a local caffeine concentration greater than zero, the core comprises caffeine.

The maximum ratio of active zone mass to ice mass occurs where the core contains no caffeine and where the active zone caffeine concentration throughout the entirety of the active zone is at the minimum possible value of 150% relative to the ice caffeine concentration. In this situation, if the ice caffeine concentration were c mg/g, then the minimum active zone caffeine concentration would be 1.5 c mg/g. The active zone then at the limit comprises no more than two-thirds of the ice mass. Where it is chosen to constrain the proportion of active zone mass to ice mass to a lower value, the active zone caffeine concentration necessarily increases relative to the ice caffeine concentration. Preferably, the proportion of active zone mass to ice mass is constrained to suit the proportion of melting likely to occur during envisioned beverage cooling scenarios.

In order that most or all of the caffeine present in the active zone is disbursed into the beverage in the initial cooling phase, it is of value to have a usefully accurate model of the melting of ice which occurs during beverage cooling.

As previously discussed, where a beverage is cooled from an initial temperature of about 20-25° C. to about 4.4° C., for each gram of beverage that is cooled about 0.20 to 0.26 g of ice melts. The maximum amount of ice used to cool a beverage is ordinarily the amount that can fill a beverage glass prior to the pouring of a beverage, e.g., approximately 1.5 g of ice per gram of beverage. In such an instance, about 13%-17% of the ice melts in the initial cooling phase. Alternately expressed, wherein a melting proportion p may range from 0.00 to 1.00, and wherein 0.00 would represent zero percent melting of ice and 1.00 would represent 100% melting of ice, in this beverage cooling scenario the melting proportion p is typically from about 0.13 to 0.17.

In some instances a smaller amount of ice is used than would be able to fill the glass used to contain the beverage. (The term "glass" is to be understood throughout to include any type of beverage container.) In these instances, most commonly at least about 0.5 g of ice is used per gram of beverage cooled. Where only about this amount of ice is used per gram of beverage cooled, in our findings about 39-52% of the ice melts in the initial cooling phase. Alternately expressed, the melting proportion p is then from about 0.39 to about 0.52. In some instances, the melting percentage may be about 50% or even higher, or the melting proportion p may be about 0.5 or even higher. But to enable broader applicability it is advantageous to design the ice according to the invention wherein the ice is optimized for beverage cooling scenarios in which the amount of melting is no greater than about 50%.

There are of course also intermediate beverage cooling scenarios in which an intermediate amount of ice is used, e.g., between 0.5 g and 1.5 g of ice per gram of beverage. In these instances, the proportion of ice melted is also intermediate between the above-discussed values.

In considering specific preferred embodiments of ice according to the invention, conceptually one may focus on a "melt zone," which corresponds usefully with the spatial region of the ice which may largely or entirely melt during the initial cooling phase of a chosen beverage cooling scenario. The melt zone extends a uniform depth, which is the melt zone depth, d, perpendicularly inwards from each point of the ice external surface.

The inventors have found from experimentation with cuboid ice cubes with rectangular faces that melting occurs to essentially equal depth from each face, and from experimentation with tube-shaped ice that melting occurs to essentially equal depth from each surface. These results are consistent with physical melting processes. It is believed that, during a given amount of beverage cooling, melting from the external surface of ice particles generally occurs to a similar depth from most points of the ice external surface. Accordingly, in the devised model of melting, the melt zone extends perpendicularly inwards from the ice external surface an equal distance from all points of the ice external surface while remaining within the ice external surface. It will be understood that the melt zone refers to a geometrically-defined region of the ice particle and cannot in all possible scenarios be identical with the region of ice that melts in beverage cooling, as the extent of melting will vary between different scenarios. Rather, the melt zone is usefully similar to, rather than identical with, the region of ice that melts in a chosen beverage cooling scenario.

Where the ice mass is denoted as m and is expressed in grams, inclusive of values less than one gram, the melt zone depth d value in millimeters for any melting proportion p is defined as:

$$d = 5.14 \cdot m^{1/3} \cdot ((1-(1-p)^{1/3}) \text{mm/g}^{1/3}$$

Illustratively and as non-limiting examples, where p is 0.50, which value there is general advantage not to exceed, the melt zone depth will be $1.06 \cdot m^{1/3}$ mm/g$^{1/3}$; where p is 0.35 the melt zone depth will be $0.69 \cdot M^{1/3}$ mm/g$^{1/3}$; where p is 0.25 the melt zone depth will be $0.47 \cdot m^{1/3}$ mm/g$^{1/3}$; and where p is 0.15 the melt zone depth will be $0.27 \cdot m^{1/3}$ mm/g$^{1/3}$.

The melt zone may be, but is not necessarily, identical to any physically distinct region of the ice particle. In some instances, the active zone may comprise the entire melt zone, in which case the two regions are identical. In many embodiments, however, a subset of the melt zone comprises the active zone, and another subset of the melt zone comprises the core. As a general matter, the melt zone is a function of the ice external surface geometry and the above mathematical relationship we have defined rather than the melt zone being necessarily a physically distinctive region. Setting a melt proportion p appropriate to the envisioned beverage cooling scenario and then setting active zone geometry according to the resulting melt zone yields an ice particle architecture that efficiently delivers caffeine into the beverage in the initial cooling phase, in accordance with aspects of the invention.

A number of values or amounts may be predetermined with regard to manufacture, production, or physical creation of the ice. The ice caffeine concentration, active zone maximum depth, and active zone caffeine concentration are very preferably predetermined. These amounts may be essentially exact or may be approximate, subject to manufacturing variability.

The ice mass, the mass of the core, active zone mass, and active zone caffeine mass may also be predetermined. In some embodiments, for example where ice is crushed or irregularly cut after forming, the ice may be variable in these latter parameters as a result of variability in crushing or cutting, but the ice may conform to specifications for distribution of these properties and the manufacturing process comprises predetermination of these properties as ranges or distributions.

The invention, according to how certain features of the invention are embodied, can provide predetermined amounts of caffeine to a beverage over a wide range of possible ice amounts and possible caffeine delivery amounts. As beverage cooling scenarios may vary as may amounts of caffeine that are desired, the ice caffeine concentration may be between 0.05 and 10 milligrams per gram of ice mass (mg/g), and in many presently preferred embodiments is between 0.1 and 1 mg/g.

The amount of caffeine in the ice may be and preferably is set according to the expected beverage amounts that will be cooled by the ice. While the invention is not limited to such embodiments, preferred embodiments include those where the ice contains from about 2.5 to about 35 mg and more preferably from about 4.0 to about 16 mg of caffeine per ounce of beverage that it may cool.

Where beverage glasses may be completely filled or nearly completely filled with ice, each gram of ice may cool about two-thirds of a gram of beverage that is combined with the ice. Preferred embodiments of the ice for such beverage cooling scenarios include embodiments where the ice contains from about 0.05 to about 0.80 mg and more preferably from about 0.09 to about 0.40 mg of caffeine per gram of ice. In some instances, however, where ice very concentrated in caffeine is desired, such as where one or a few cubes of ice are to be used to cool a "rocks" drink and a relatively large amount of total caffeine is desired, the ice caffeine concentration may be in excess of 1 mg/g but will be no greater than 10 mg/g.

Where beverage glasses may be only partly filled with ice prior to pouring of a beverage, or substantially less ice than would be needed to fill an empty glass is added to a beverage that has already been poured into the glass, each gram of ice may be expected to cool and is suited to cool from substantially more than two-thirds of a gram up to about 1.5 grams of beverage that is combined with the ice. Preferred embodiments of the ice for such beverage cooling scenarios include embodiments where the ice contains from about 0.10 to about 1.9 mg and more preferably from about 0.20 to about 0.85 mg of caffeine per gram of ice.

Where the ice may be used to cool beverages either with complete or substantially incomplete filling of the glass, the ice in preferred embodiments may contain from about 0.10 to about 0.80 mg and more preferably from about 0.20 to about 0.40 mg of caffeine per gram of ice.

In further aspects of the invention, ice may be served in amounts within a "serving mass range," which is the range of the mass of ice that one expects to use for a beverage serving. It may comprise a single mass with a margin of variation that optionally may be unstated in amount, or may comprise a stated range with lowest and highest values. Where the serving mass range comprises a single stated mass, preferred ranges comprise from about 23 to 300 mg and more preferably from about 50 mg to about 200 mg of caffeine. Where the serving mass range comprises a lowest value and a highest value which are substantially different from each other, preferred embodiments includes those where an amount of ice of the lowest mass within the serving mass range contains at least 23 mg and more preferably at least about 50 mg of caffeine, and an amount of ice of the highest mass within the serving mass range contains no more than 300 mg of caffeine, and more preferably no more than 200 mg of caffeine.

It is preferred for most or all of the caffeine in the ice to be contained within the active zone of the ice particles, and at least 40% of the caffeine of the ice particle is contained within the active zone of the ice particles. While remaining within these limits, the active zone caffeine mass comprises the desired ice caffeine mass, or ice caffeine concentration times the ice mass, minus the caffeine content if any of the core.

The active zone caffeine concentration is at least 0.4 mg/g and generally should be no higher than 20 mg/g, except where a suspension of caffeine in the active zone is desired. It is presently usually preferred, however, for the active zone to not be so concentrated as to require a suspension.

The amount of caffeine in the core is preferably zero in most instances, and in all cases is no more than 60% of the ice caffeine mass. In some instances manufacturing practicalities may result in the presence of some caffeine in the core within the parameters of the invention, and this is acceptable. In other instances, caffeine may be deliberately included in the core in significant quantity. Illustratively, it could be desired to address the issue that, when a beverage is consumed over a quite extended period, the beverage in the final stages of drinking is "watery." By including some caffeine in the core, the final stages of drinking would not be as watery in character. Flavoring or sweetener might be included in the core for the same reason. Such inclusions of caffeine, flavoring, or sweetener in the core are optional and are determined by preference, within the defining parameters of the invention.

In accordance with another aspect of the invention, the ice may have a predetermined serving mass, having a lowest serving mass value of at least 10 g and a highest serving mass value no greater than about 900 g and more typically no more than about 850 g.

Preferably an amount of ice of the lowest mass value of the predetermined serving mass range contains at least 23 mg of caffeine and an amount of ice of the highest mass value of the predetermined serving mass range contains no more than 600 mg of caffeine, and preferably no more than 300 mg of caffeine.

The core may contain substances present in the source water, which typically is ordinary drinking water but which may be filtered, processed with reverse osmosis, distilled, treated with ultraviolet light, or otherwise purified or treated. The core typically or preferably will have essentially the same composition as that of conventional or known ice cubes, although this is not necessarily limiting. Preferred compositions that comprise typical or ordinary ice cube construction generally would consist essentially of water, with impurities as are customarily found in potable water of the area in which the ice is made. An ice core that is made of publicly-available tap water, for example, would be expected to include trace amounts of mineral impurities, chlorine, bromine or other sanitizing and anti-microbial components, and the like. An ice core that is made of filtered or purified water may have fewer or different impurities, it may exclude ions, and the like, as one would expect from the different composition of the liquid water starting material itself.

The core may be substantially free of caffeine, i.e., in the sense that it either contains no caffeine, or any amounts of caffeine in the core are in such small concentration as to be negligible. This allows for a generally more economic process, e.g., by avoiding the need for inclusion of caffeine that is not ultimately delivered into the beverage. It is permissible, however, in some instances for caffeine to be present in the core. Examples could include circumstances in which there is some level of caffeine in the source used to make the core, or wherein the process of making the ice lends itself to, or perhaps requires, that some caffeine make its way into the core. In transitioning from production of the core to production of the active zone, for example, there may be a concentration of caffeine that falls within the region that comprises the core. Another example could include where a purpose is to allow limited amount of further caffeine delivery after the initial cooling phase. To enable the achievement of such ends where desired, the core may contain significant caffeine concentrations provided, as per the limitations of the inventions, that throughout the core the local caffeine concentration is less than 150% of the ice caffeine concentration.

Figure 7:
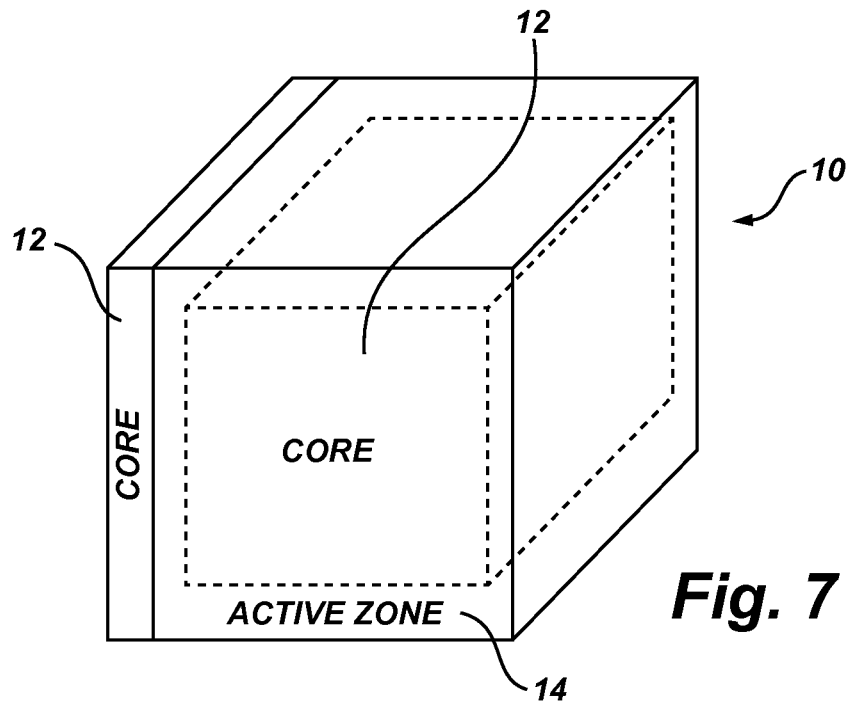
FIG. 7 is a perspective view of a cuboid ice particle according to another presently preferred embodiment of one aspect of the invention, and which illustrates principles of other aspects of the invention.

The core is disposed within all of the part of the ice particle that is not the active zone. There is no requirement for all the ice of the core to be contiguous: core ice may be contained in more than one bounded volume separated one from another by in between-placed active zone, as for example in FIG. 7. The core may be but is not required to be contiguous with the ice external surface. For example, in FIG. 2 the core is contiguous with the ice external surface while in FIG. 1 it is not.

The active zone may be designed or configured, and preferably is, so that any or all of several advantageous features can be manifested or obtained in the course of delivering caffeine into the beverage.

One such feature is that most or all of the caffeine in the ice is delivered into the liquid phase while the beverage is being consumed. A related but more specific feature is to control the amount of caffeine that is delivered into the beverage and thus consumed by the consumer while the beverage is being consumed, i.e., as a function of time.

A second optional feature is to maximize the economic efficiency of the caffeine delivery. The overall cost of delivering a fixed quantity of caffeine generally can be reduced if the caffeine is located substantially or optionally solely in the portion of the ice that is melted and thus transferred into the bulk liquid to be consumed, and little or none is disposed in the portion of the ice that remains after beverage consumption is complete. This avoids the effort and expense of the additional caffeine that otherwise would remain unconsumed and be discarded.

These features can be obtained by predetermining, selecting or controlling the geometry of the active zone, and by predetermining, selecting or controlling the form and concentration of caffeine within the active zone. With respect to the geometric aspect, the release of caffeine from the active zone can be controlled, for example, by predetermining, selecting or controlling the radial or axial depth of the active zone relative to its external surface.

Preferably, one establishes the geometric location or locations of the active zone, and more specifically the radial or axial depth of the active zone, during the fabrication process. As will be described more fully herein below, one may manufacture ice according to preferred method implementations of aspects of the invention by providing a frozen core that is of lower caffeine concentration than is the active zone or is substantially free of caffeine, and then adding an active zone onto the core. In such instances, the depth of the active zone can be predetermined by controlling the extent of the active region that is applied to the core. One also may manufacture ice according to further preferred method implementations of aspects of the invention by providing a frozen active zone and then adding onto the active zone a core that is of lower caffeine concentration than the active zone or is substantially free of caffeine. It is further devised that multi-step variations may be implemented: e.g., a frozen active zone part may be provided, a core frozen onto it, and then further active zone frozen onto the core, as well as other variations that will be apparent from the devised method implementations taught herein.

The active zone is disposed such that at least 67% and more preferably 100% of the caffeine in the ice particle is contained within a depth in millimeters from the ice external surface no greater than 1.06 times the cube root of the ice mass in grams. Illustratively, if the ice mass is 27 grams, at least 67% of the caffeine and more preferably 100% of the caffeine in the ice particle is disposed within 3.18 (1.06 times $27^{1/3}$) millimeters from the ice external surface. This necessarily requires most of the mass of the active zone to be disposed more closely to the ice external surface than is most of the mass of the core, according to devised specifications and method provided herein regulating the depth of the active zone relative to the ice external surface.

While the teachings of the invention include provision of required and suitable active zone depths according to ice mass without need for calculating a melt zone and the invention may be fully employed without such calculation, conceptually one may understand geometry of the active zone by referencing it to the melt zone as specified above. Preferably, the active zone is largely or entirely contained in the melt zone as calculable from a melt proportion suited to the beverage cooling scenario: i.e., it is preferred that at least 67% of the points in the active zone have a depth no greater than the melt zone depth, or even more preferably that the active zone maximum depth is no greater than the melt zone depth.

Figure 3:
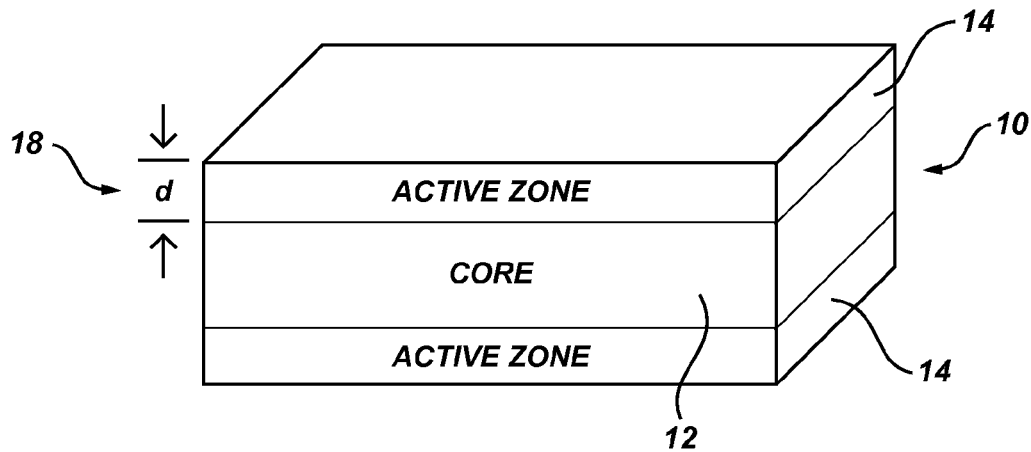
FIG. 3 shows a perspective view of a cuboid ice particle according to another presently preferred embodiment of one aspect of the invention, and which illustrates principles of other aspects of the invention.

The term "active zone" always refers to the entirety of regions wherein the local caffeine concentration is greater than 150% of the ice caffeine concentration, and so therefore refers to the entirety of the bounded regions of the active zone, which may be a single bounded region as in FIG. 1, or may be more than one bounded region, as in FIG. 3. An example of a bounded region may comprise a face of a cubic or cuboid ice particle.

The active zone optionally may surround all of the core, as for example in FIG. 1. Where it does not surround all of the core, it may surround some of the core as for example in FIG. 7, or none of the core, as for example in FIG. 2.

Figure 8:
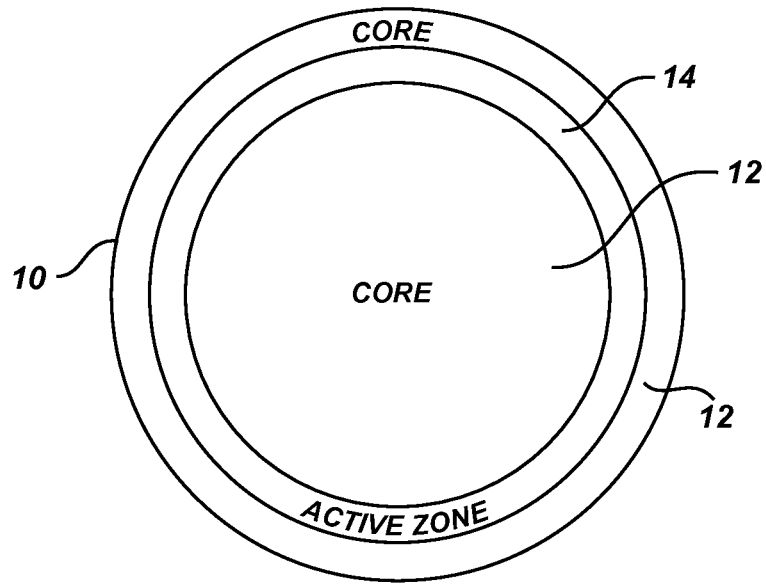
FIG. 8 is a cross sectional view of a spherical ice particle according to another presently preferred embodiment of one aspect of the invention, and which illustrates principles of other aspects of the invention.

The active zone optionally but very preferably is contiguous with the ice external surface, as in FIG. 1. In some embodiments, a thin layer of core may optionally surround the active zone, as in FIG. 8. In some embodiments the active zone comprises at most only part of the ice exterior surface. One example is where the active zone comprises entirely only one face of a cuboid ice particle, with its thickness extending onto four other faces, as in FIG. 2. Another example is that in some embodiments active zone is sprayed and frozen onto ice cores and the spray reaches only part of the ice cores, for example, only the exposed hemispheres, as in FIG. 5.

While many preferred embodiments comprise no substances in the ice other than frozen water (which may include trace substances present in the source water) and caffeine, the ice optionally may contain one or more added nutritionally-acceptable ingredients such as an electrolyte, mineral, food color, flavoring, sweetener, herbal extract, vitamin, amino acid, and glucuronolactone. Optional flavorings include orange, cola, caramel, chocolate, coffee, espresso, mocha, vanilla, green apple, grape, lemon, and lime, of which orange, coffee, espresso, mocha, and flavors comprising cola flavor are presently preferred, where any flavoring is included. Optional sweeteners include sucrose, fructose, sucralose, aspartame, saccharine, acesulfame K, stevia, Luo Han extract, and thaumatin, of which sucralose, aspartame, acesulfame K, and thaumatin are presently preferred, where any sweetener is included. Optional vitamins include Vitamin B3, Vitamin B6, and Vitamin B12.

Where sucralose is optionally included in the ice, a presently preferred amount is 2-3 mg per milligram of caffeine, or most preferably about 2.6 mg of sucralose per milligram of caffeine. Where thaumatin is optionally included in the ice, a presently preferred amount is 0.15 to 0.6 micrograms of thaumatin per milligram of caffeine.

The core and active zone may differ in their inclusion or concentration of any added ingredient. For example, it can be advantageous for a sweetener to be used in combination with caffeine in order to offset the bitterness of caffeine, and to achieve this advantage, in a given embodiment the active zone might incorporate sucralose in a concentration as given above while the core incorporates sucralose in a lesser concentration or not at all. A reason to incorporate some sucralose in the core could be to provide added sweetness in the final stages of drinking where an extended drinking time would result in the melting of a large proportion or all of the ice.

Similarly, flavorings if included might be incorporated differently between the active zone and the core.

In the case of optional inclusion of vitamins, there could be advantage to incorporating one or more vitamins preferentially in the active zone so that the desired dosage could be disbursed into the drink during the initial cooling period, with little if any further delivery past that time point.

To illustrate features of ice according to this aspect of the invention, ice, and more specifically a "cube" or particle of ice 10 according to a presently preferred embodiment is shown in FIG. 1. In this embodiment, the cubes are substantially spherical.

The core 12 according to this aspect of the invention comprises ice manufactured using purified water. Core 12 is substantially free of caffeine. By this it is meant that there is either no caffeine present in the core, or that the concentration of any caffeine in the core is at trace levels, or levels that are sufficiently low that they do not impart perceptible psychological or physiological effects to persons consuming beverages that contain such cores in amounts that normally would be used in typical beverage applications.

The core 12 may assume any of a variety of shapes, for example, including those corresponding to the different shapes of commercial ice as noted herein above. In this embodiment, of course, they are substantially spherical.

With reference to the presently preferred embodiment of FIG. 1, ice 10 comprises a core 12, which in this illustrative embodiment is substantially spherical. Core 12 comprises ice manufactured using purified water.

With reference to the presently preferred embodiment shown in FIG. 1, ice 10 comprises an active zone 14 adjacent to and surrounding the core 12. An ice exterior surface 16 extends around and defines the outer boundary of ice 10.

Figure 6:
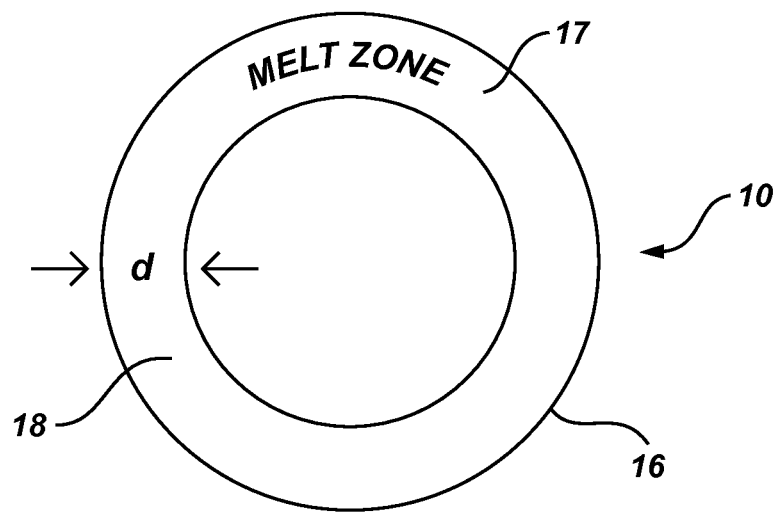
FIG. 6 shows a cross sectional view of a spherical ice particle according to another presently preferred embodiment of one aspect of the invention, and which illustrates principles of other aspects of the invention.

As shown in corresponding FIG. 6, ice 10 has a melt zone 17 having a melt zone depth 18 denoted by the letter d. In the illustration of FIG. 1, the active zone 14 extends perpendicularly and radially inwards from the ice exterior surface a uniform depth equal to the melt zone depth, but at varying points from the ice external surface the active zone may extend a variety of depths, both uniform and non-uniform, within the scope and limitations of the invention as specified above.

Figure 2:
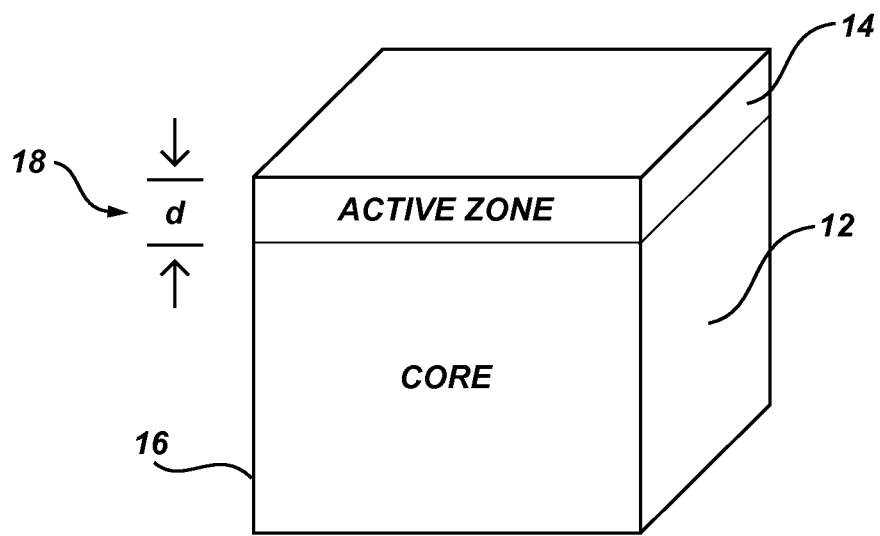
FIG. 2 shows a perspective view of a cubical ice particle according to another presently preferred embodiment of one aspect of the invention, and which illustrates principles of other aspects of the invention.

Ice according to a second preferred embodiment, in which the ice cubes or particles are in a cubic shape, is shown in FIG. 2. The cubic shape of ice 10 is characterized by six equal-sized square faces joined by mutual 90° angles. Ice comprises a core 12 that has a cuboid shape. An active zone 14 is disposed about one face of the core 10.

Ice 10 has an ice exterior surface 16 and a melt zone depth 18 denoted by the letter d. In the illustration of FIG. 1, the active zone 14 extends perpendicularly inwards from the ice exterior surface a uniform depth equal to the melt zone depth, but at varying points from the ice external surface comprising active zone the active zone may extend a variety of depths, both uniform and non-uniform, within the scope and limitations of the invention as specified above.

The active zone 14 comprises a substantially uniform concentration of caffeine along the x, y and z axes that is about 15 mg/cm$^3$, although optionally the concentration may be non-uniform. In this particular instance, the core is substantially free of caffeine, but optionally it may comprise caffeine within the limits of the invention set forth above.

Ice according to a third preferred embodiment, in which the ice cubes or particles are in a cuboid shape, is shown in FIG. 3. This cuboid shape includes mutual 90° angles as in a cubic ice particle, but includes faces that comprise at least one set of rectangles as opposed to squares. As with the cubic ice particles, ice 10 comprises a core 12 that optionally but preferably has a cuboid shape. An active zone 14 comprising two cuboid regions is disposed about the core, with each region contiguous with one face of the core 12, and with the core 12 separating the two regions of the active zone 14. The active zone 14 comprises a substantially uniform concentration of caffeine along the x, y and z axes that is about 10 mg/cm$^3$, while the core comprises a substantially uniform concentration of caffeine along the x, y and z axes that is about 0.5 mg/g.

Figure 4:
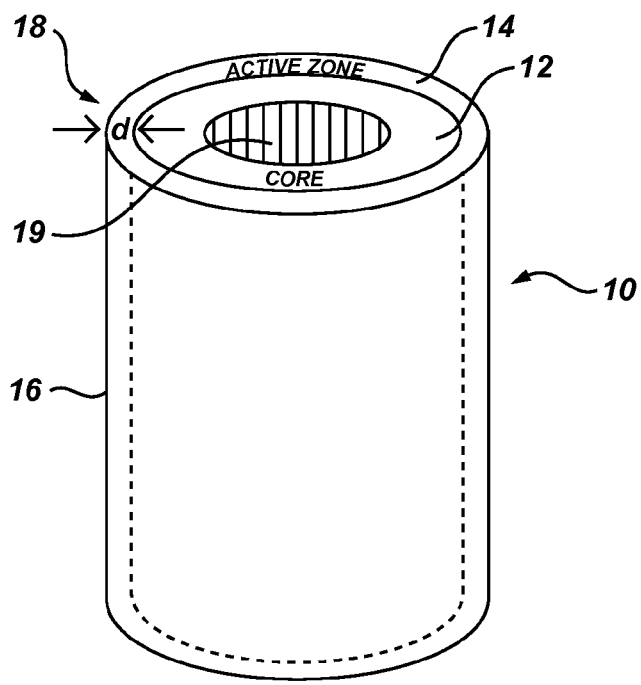
FIG. 4 shows a perspective view of a tube-shaped ice particle according to still another presently preferred embodiment of one aspect of the invention, and which illustrates principles of other aspects of the invention.

Ice having a tubular shape according to a fourth embodiment is shown in FIG. 4. Ice 10 comprises at its exterior a length of about 32 mm, an outside diameter of about 28 mm, and a central passage 19 with a diameter of about 10 mm. Ice 10 has an ice mass of about 15.8 g and comprises an ice caffeine concentration of about 0.50 mg/g. It therefore comprises about 7.9 mg of caffeine. In this particular embodiment, the active zone 14 comprises all the caffeine contained in ice 10 and the core 12 is substantially free of caffeine.

The core 12 is disposed about the central passage 19. The outer circumference of the core 12 is surrounded by and contiguous with active zone 14.

The melt zone depth 18 in the particular instance illustrated is set according to a melt proportion value of 0.2, which given the ice mass of 15.8 g solves to 0.92 mm. This specific melt proportion value, however, is illustrative only.

In FIG. 4, the active zone 14 extends perpendicularly and radially inwards from the outer circumference of the ice exterior surface 16 a uniform depth equal to the melt zone depth 18, but at varying points from the ice exterior surface comprising active zone the active zone may extend a variety of depths, both uniform and non-uniform, within the scope and limitations of the invention as specified above. The active zone 14 optionally may also extend over the core 12 at one or both ends of the tube-shaped ice particle 10 as well, or interpose between the core 12 and the central passage 19, but in the illustration does not.

Standard geometric calculation from the above dimensions yields an active zone volume in the above instance of about 2.50 cm$^3$. Approximating the active zone mass from this volume and a typical value of 0.9167 g/cm³ for the density of ice gives an active zone mass of about 2.30 g. As the active zone comprises about 7.9 mg of caffeine, the active zone caffeine concentration is therefore set to about 3.43 mg/g, with a substantially uniform concentration of caffeine along the x, y and z axes.

Figure 5:
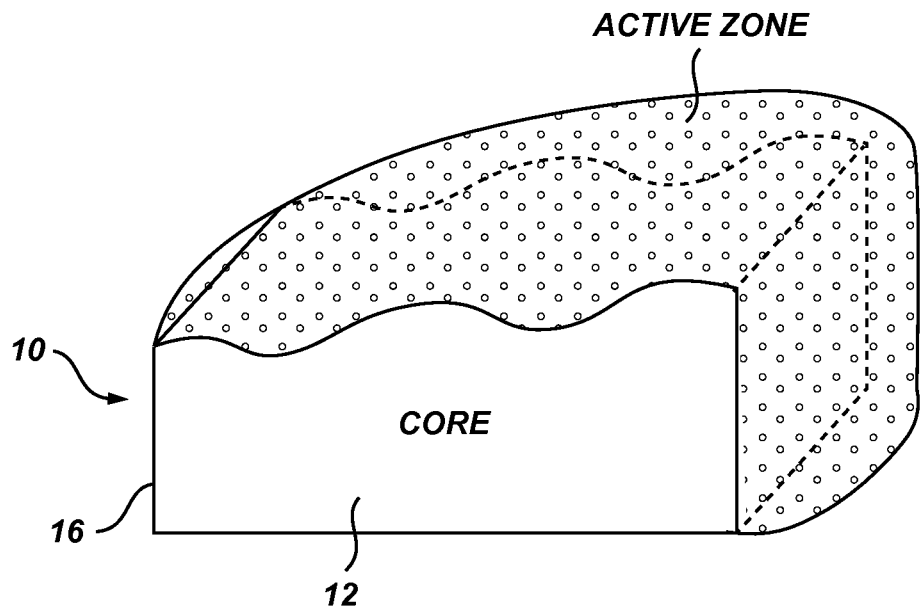
FIG. 5 shows a cross sectional view of an irregularly shaped ice particle according to another presently preferred embodiment of one aspect of the invention, and which illustrates principles of other aspects of the invention.

Ice 10 according to a fifth preferred embodiment is shown in FIG. 5. In this embodiment, the ice 10 comprises flake ice, in which each particle of ice has an irregular shape and has an ice external surface 16. The core 12 comprises ice, is substantially free of caffeine, and comprises about half of the ice external surface 16. The active zone 14 comprises the remainder of the ice external surface.

In accordance with another aspect of the invention, a method is provided for cooling a beverage, wherein caffeine is delivered to the beverage in the course of cooling it. In accordance with this method, ice is disposed wherein the ice comprises a core, an active zone, and an external surface, wherein the active zone comprises caffeine at a higher concentration than does the core and most of the active zone is disposed more closely to the external surface than is most of the core. Examples and limiting specifications of such ice are described herein above. The method further comprises combining the beverage and the ice, whereby the active zone of the ice melts and releases the caffeine into the beverage in an initial phase of beverage cooling, which comprises cooling the beverage from a typically-ambient initial temperature to about 40° F. (4.4° C.). The selection, configuration and composition of the core and the active zone are as described herein above, as is the phenomenology of the melting of the active zone and the release of the caffeine into the beverage. Preferably, the active zone is configured so that most or all of the active zone melts but none or a much lesser proportion of the core melts during the initial cooling period.

In accordance with another aspect of the invention, a method is provided for making beverage ice. A preferred implementation of this method will now be described using the schematic illustrations in FIG. 9 and FIG. 10, wherein the schematics show a first aqueous solution 20, at least one differing aqueous solution 22, a freezing location 24, and an evaporator 26.

The method comprises first providing a first aqueous solution optionally comprising caffeine and providing at least one differing aqueous solution comprising caffeine with a caffeine concentration of at least 0.4 mg of caffeine per gram of solution and of at least twice the caffeine concentration of the first aqueous solution. In most instances, there is only one differing aqueous solution. The term "solution" is to be understood to be inclusive of suspensions.

Figure 9:
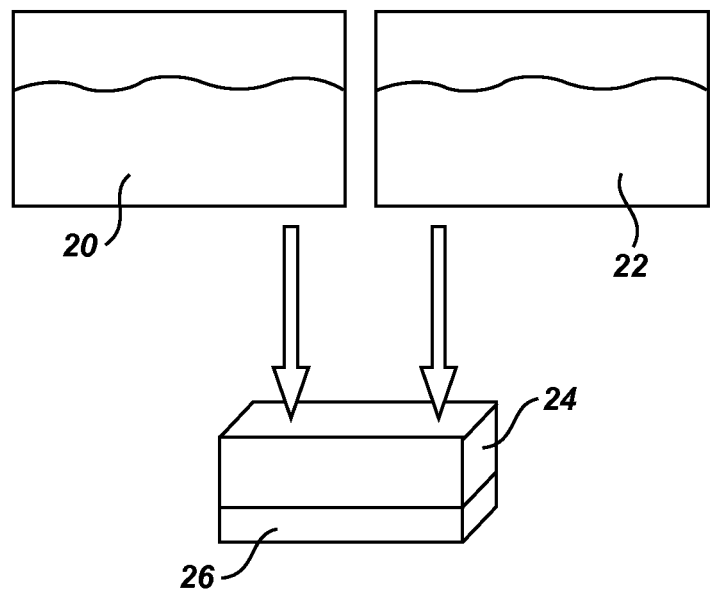
FIG. 9 is a schematic diagram illustrating a presently preferred implementation of a method for making beverage ice according to another aspect of the invention.

The preferred method implementation further comprises providing and completing a flow consisting at each non-interrupted part of the flow of at least one of the first aqueous solution, a differing aqueous solution comprising caffeine, and a mixture thereof, which flow is indicated in FIG. 9 by arrows. The flow may be conducted by one path or by more than one path. The flow is to a freezing location, such as a plate, tube, or cell, cooled by an evaporator. The flow may be continuous or interrupted, and may comprise varieties of flows such as sprays, drips, etc., or applications of aqueous solution by objects such as rollers or brushes, etc. Flow may comprise movement of frozen aqueous solution such the moving of an individual piece of ice from one place to another, for example to a cell containing a differing aqueous solution, as a non-limiting illustration.

At each point in time the flow comprises a momentary caffeine concentration which is equal to the mass of caffeine in the volume currently being flowed divided by the mass of that volume. The momentary caffeine concentration may be zero in the instance where the flow is of only the first aqueous solution. Flow may be regulated by mechanical means, inclusive of any mechanical or electromechanical means, for example by hydraulic properties of lines carrying the flow and of pumps, and by means of computer control of switches, valves, pumps, and other types of apparatus well known in the art.

Over the course of the flow, the momentary caffeine concentration changes and reaches at least 0.5 mg/g during the course of the flow. A sufficient amount of differing aqueous solution is flowed to achieve an ice caffeine concentration of at least 0.05 mg/g and more generally to achieve a predetermined ice caffeine concentration suited to the envisaged use according to teachings provided herein.

After having flowed to completion, inclusive of concurrently occurring partially while flow is occurring, the aqueous solutions are frozen fully, optionally followed by division into smaller pieces by means inclusive of but not limited to cutting and crushing. This yields the ice. The ice has an ice external surface.

Various types of freezing locations may be used. A plate may be used, and may be horizontal or vertical, or in some cases angled. Cells may be used, and the open faces of the cells may be the upper or lower horizontal faces, or may be vertical faces. Where the open faces of the cells are the lower horizontal faces, typically the flow is sprayed into the cells and freezes on contact. Optionally, only some of the flow may freeze and the remainder of the flow may drip and either be recovered or discarded. Tubes also may be used as the freezing location, and may be vertical, horizontal, or in some cases angled.

Most of the caffeine frozen into the ice is disposed more closely to the ice external surface than is most of the first aqueous solution frozen into the ice.

Figure 10:
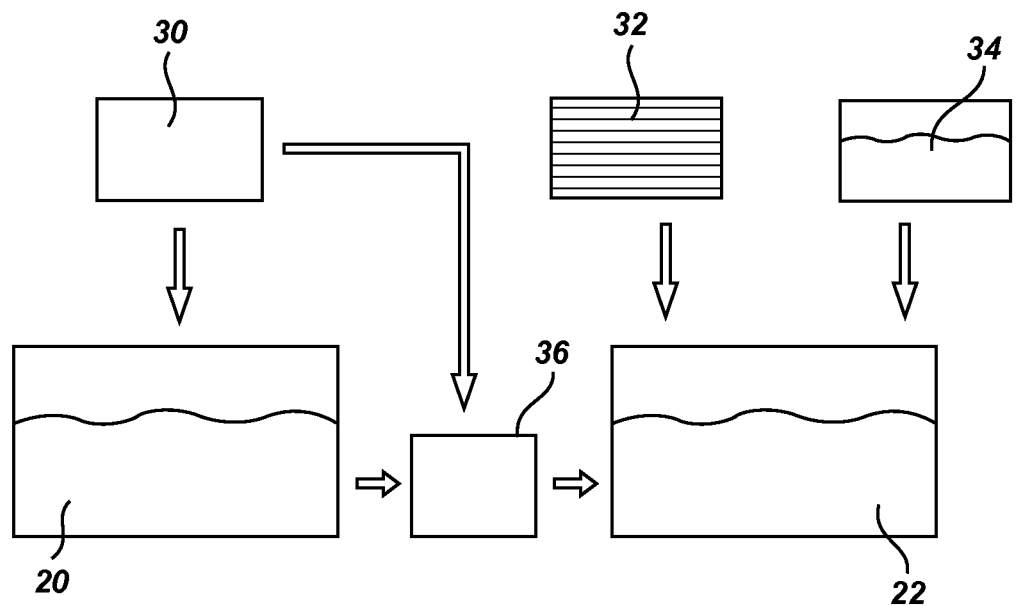
FIG. 10 is a schematic diagram illustrating a presently preferred implementation of another method for making beverage ice according to another aspect of the invention.

FIG. 10 schematically shows certain optional features with regard to provision of caffeine and with regard to filtration of water. The figure depicts a first aqueous solution 20, at least one differing aqueous solution 22, source water 30, solid form caffeine 32, liquid form caffeine 34, and purification device 36.

As shown schematically in FIG. 10, the caffeine of the one or more differing aqueous solutions may be provided to the place of manufacture as solid form caffeine or as relatively concentrated liquid form caffeine to be mixed with potable source water to form at least one differing aqueous solution at the place of ice manufacture. The one or more differing aqueous solutions may also be provided directly in a container to the place of ice manufacture.

The water of the one or more differing aqueous solutions may be differently purified than the first aqueous solution. This can be of advantage because in many ice-making machines the ice-forming process itself purifies water, and separate water filtration is avoided in order to reduce operational cost and maintenance. This process however depends on pure water freezing at a temperature slightly higher than the melting point of ice containing solutes. As caffeine itself is a solute, such a purification process may work effectively for the first aqueous solution but not for the one or more differing aqueous solutions. For these solutions to also be pure, it can be advantageous to purify their water source separately. To accomplish this, the source water may be directed to a purification device either directly or via the first aqueous solution, with the purified water supplied to the one or more differing aqueous solutions.

To accommodate lowering of the freezing point by included caffeine, the freezing location may be cooled at time points while the flow comprises caffeine to a lower temperature than while the flow does not comprise caffeine.

In accordance with another aspect of the invention, a method is provided for making beverage ice. The method comprises providing an ice core, and providing to the core an aqueous caffeine-containing solution having a caffeine concentration of at least 0.4 milligrams of caffeine per gram and at least twice the caffeine concentration of the core. The method also comprises disposing the aqueous caffeine-containing solution onto the core and to freeze onto the core to form ice comprising an ice external surface and caffeine. At least 67% of the caffeine in the ice is within a depth in millimeters from the ice external surface no greater than 1.06 times the cube root of the ice mass in grams, and the amount of the caffeine in the ice is at least 0.05 mg of caffeine per gram of the ice.

Preferably but optionally, the caffeine-containing solution consists of or consists essentially of only caffeine and water. Alternatively, and again preferably but optionally, the caffeine-containing solution consists of or consists essentially of caffeine, water and a sweetener. The sweetener may comprise naturally occurring sugars such as sucrose and fructose, and any of the commercially-available sugar substitutes such as aspartame, stevia, sucralose and saccharine, or combinations of these. Preferred sweeteners comprise sucralose, aspartame, acesulfame K, and thaumatin.

The provision of the ice core may be accomplished in a number of ways, examples of which are provided herein below.

In one example, a mass of solid ice from which multiple cores may be obtained is fabricated by running water along a surface ("freezing surface") that is at a temperature of less than 0° C. so that the temperature of the water is reduced to form a sheet or body of ice of predetermined thickness. The surface may be vertical, horizontal, or angled. The surface may be flat, it may comprise a grid, or even comprise the interior of a tube. A drain may be provided to accept run-off water. Upon the ice reaching a predetermined thickness, this initial process of forming the mass of ice is completed.

In one version of this process, the aqueous caffeine-containing solution may be applied at this point of the process, prior to any removal of this ice from the freezing surface. In this version, the aqueous caffeine-containing solution can be frozen onto the cores to form the active zone within the same equipment and without movement of the ice core from that equipment.

After the sheet of ice has been formed to the predetermined thickness as described herein above, the sheet, if not already at a sufficiently low temperature, is further cooled sufficiently to enable the facile freezing of aqueous caffeine-containing solution to the surface of the sheet, for example to −10° to −20° C. Where the freezing surface comprises a vertical, horizontal, or angled sheet, the aqueous caffeine-containing solution may be flowed at a controlled rate onto the sheet until a predetermined thickness of caffeine-containing solution has frozen onto the ice core. The flow rate and flow regime are chosen to provide substantially uniform thickness with minimal waste. Alternatively, spraying mechanisms may apply the caffeine-containing solution onto the core ice until a predetermined thickness of caffeine-containing solution has been applied.

Inasmuch as the surface onto which the first-formed ice freezes can readily be part of the ice external surface, the above-described process may obviously be modified wherein the first formed ice is the active zone, onto which the core is subsequently formed.

Alternatively, in another version of the process wherein the core is formed first, after forming the ice sheet or mass of ice having a predetermined thickness, it may be divided into multiple cubes or particles, each of which comprises a core. This plurality of cores can then be treated by applying the caffeine-containing solution to the external core surfaces so that the active zone is added to each individual core.

These methods of formation of the mass of core ice or ice sheets can produce exceptionally high quality ice, as determined by optical clarity, hardness, and purity.

In an alternative process for forming the ice cores, water is placed into individual wells which are cooled by a refrigeration system to a temperature below 0° C. As the water in the wells attains freezing temperature and heat is further withdrawn, the water in each well freezes to form an ice core.

The aqueous caffeine-containing solution comprises a solution that contains a desired concentration of caffeine and is suitable for disposition on, or freezing onto, the core. The aqueous caffeine-containing solution has a caffeine concentration at least as twice as great as the caffeine concentration of the core. If the core has no caffeine in it, then the caffeine concentration in the aqueous caffeine-containing solution should be at least 0.4 milligrams of caffeine per gram of the solution. After the caffeine-containing active zone has been frozen onto the core, the composition and concentration of the caffeine in it preferably is as described herein above. At least 67% of the caffeine in the ice is within a depth in millimeters from the ice external surface no greater than 1.06 times the cube root of the ice mass in grams, and the amount of the caffeine in the ice is at least 0.05 mg of caffeine per gram of the ice. The caffeine preferably is dissolved or solubilized into the solution, although it is possible for part or all of the caffeine to be provided as a saturated or unsaturated suspension or dispersion or the like. The term "solution" in this sense preferably is used in its commonly-understood definition, e.g., to include liquid mixtures wherein a minor solute component is essentially uniformly distributed at a molecular level throughout a major solvent component, but also may be used broadly to include such variants as fine suspensions, emulsions, sols, and the like.

On application of the aqueous caffeine-containing solution to the ice core, the temperature of the core preferably should be significantly below 0° C. to enable freezing of the applied solution onto the core. An example value is −10° C. Delamination is to be avoided.

Preferably, the methods are implemented so that the active zone has dimensions, and most importantly a radial or axial depth, as described herein above in connection with the preferred embodiments.

Figure 11:
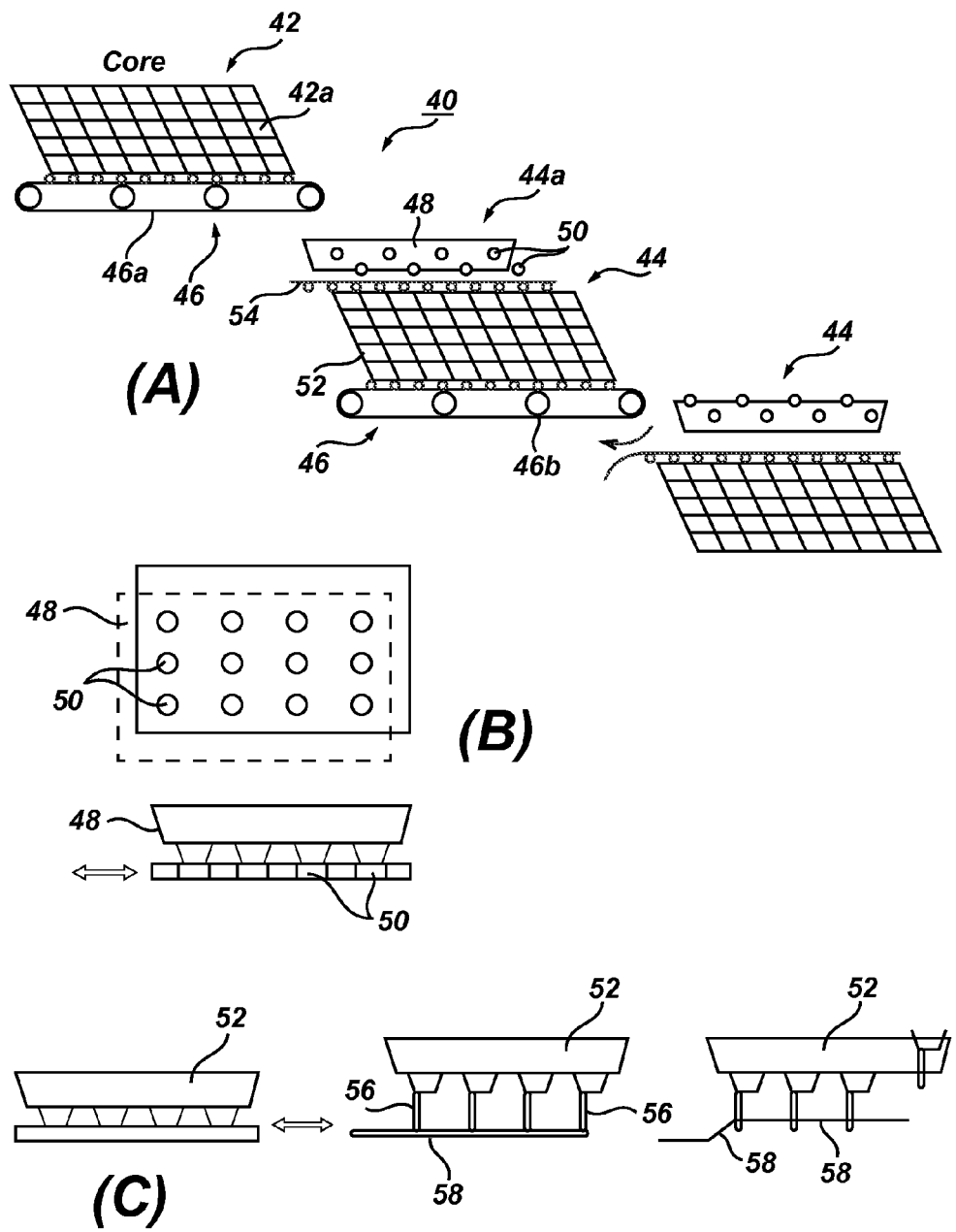
FIG. 11 is a schematic diagram illustrating another presently preferred implementation of a method for making beverage ice according to another aspect of the invention.

To illustrate this aspect of the invention, another presently preferred implementation of the method will now be described with reference to FIG. 11, which shows an equipment layout 40 for providing this preferred implementation. Layout 40 is suitable for making ice substantially as shown in FIG. 2, but wherein an active zone is disposed on or embodied in each of the six faces of the cube. With reference to FIG. 11A, the layout 40 comprises a core section 42 and an active layer section 44.

The core section 42 comprises an ice cube forming device 42a such as described herein above for the formation of core ice 12.

When the core ice cubes 12 have been formed and released from the ice cube forming device 42a, they are transferred to a conveyor system 46. Where core ice cubes were formed in wells of a tray, their removal may be accomplished by opening movable doors in the bottom of each well of tray so that the cubes fall out of the wells and onto a first section 46a of the conveyor system 46. In some instances, it may be necessary or desirable to apply heat to the walls of tray wells, and possibly to the movable doors as well, to detach the cube faces from the walls so they fall freely onto the conveyor system 46. Where core ice was formed on a sheet or in tubes, core ice is typically released with aid of heat applied to the sheet or tube and gravity and/or applied force, and then cut, for example by heated wires. Conveyor system 46 transports the core cubes 12 to a first active layer section 44a of section 44.

First active layer section 44a comprises a singulating template 48 that receives the core cubes 12 from first section 46a of conveyor system 46 and singulates them, i.e., places one cube 12 in each well of the template 48. Top and side views of singulating template 48 are shown in FIG. 11B. Once the singulating template 48 is filled with one core cube 12 in each well, doors 50 in the bottom of the wells open to drop the arrayed core cubes in a first layer tray 52 having the same number of wells, and in corresponding locations immediately below the singulating template 48. Each core cube 12 thus is dropped into a corresponding well of first layer tray 52. The wells of first layer tray 52 are slightly larger than the individual cubes 12 so that, when liquid is placed in the well as the cube occupies it, the liquid can substantially surround the cube.

A first layer liquid dispenser 54 is disposed over the first layer tray 52 and is configured to direct the first aqueous caffeine-containing solution into the wells. The core cubes 12 thus are immersed in the first tray wells beneath and within the first aqueous caffeine-containing solution.

The first aqueous caffeine-containing solution according to this illustrative embodiment is an aqueous solution of filtered or purified water, for example, as is commercially available from any of a range of commercial vendors. Caffeine is added to the solution so that it has a concentration determined by means described above.

Once the core cubes are disposed in the first layer tray wells, the temperature of the tray wells and their immediately surrounding environment is reduced to at or below the freezing point of the solution. In this illustrative embodiment, the temperature is set at about −10° to −20° C. Freezing point depression caused by the presence of the solute may be taken into account in selecting the temperature of the first layer section, although preferably the temperature is set sufficiently low that such effects are negligible.

As the aqueous caffeine-containing solution is held at or below its freezing point, an active layer that embodies caffeine at a concentration corresponding to the caffeine concentration of the first solution will be disposed onto and frozen onto the core cubes 12. This freezing operation is preferably continued until all of the caffeine-containing solution in the tray wells is frozen onto the core 12 and thus creates a cube 10 as shown in FIG. 2, wherein the core is surrounded by an active layer that is frozen onto the core. Note that the active layer does not necessarily have the same thickness at all locations, e.g., on all faces.

When the cubes in the tray are sufficiently frozen and reach a desired temperature and degree of freezing, they are transferred to a second conveyor section 46b of system 46. This may be accomplished by opening movable doors 56 in the bottom of each well of tray, essentially identical to doors 50, so that the cubes 10 fall out of the wells and onto the conveyor system 46. The doors are moved by linkages 58. In some instances, it may be necessary or desirable to apply heat to the walls of tray wells, and possibly to the movable doors 56 as well, to detach the cube faces from the walls so they fall freely onto the conveyor system 46. Conveyor system 46 then transports the cubes 10 to a collection area or to a packaging area.

Figure 12:
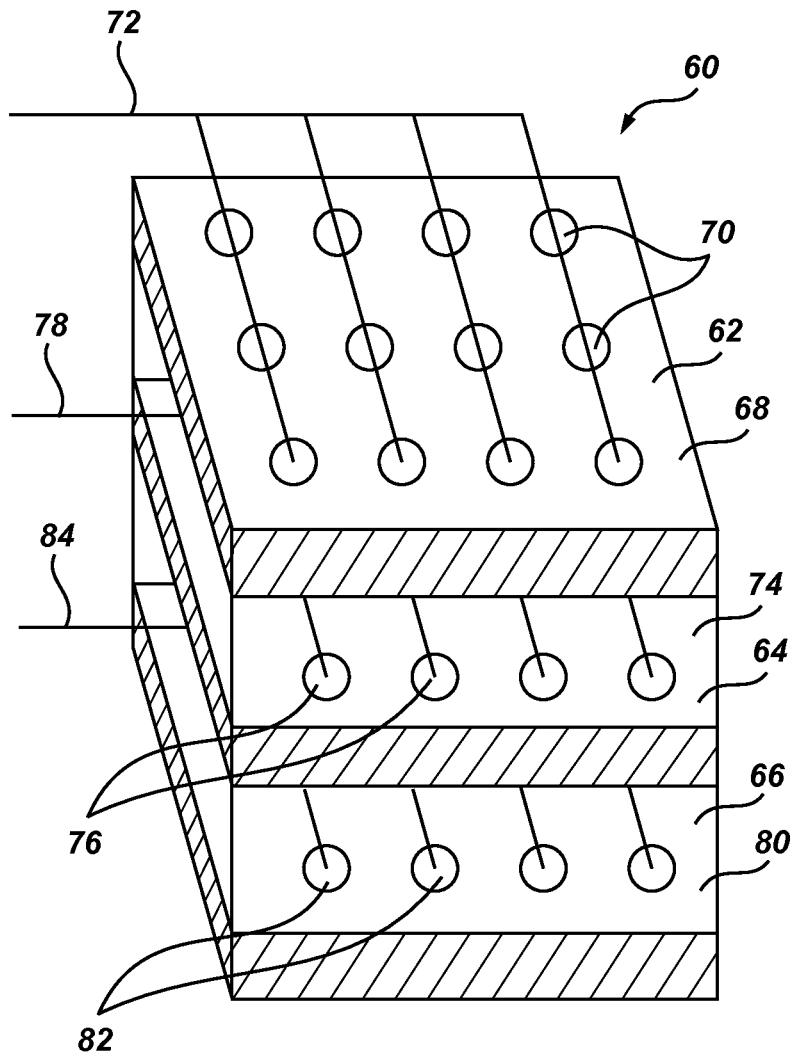
FIG. 12 is a schematic diagram illustrating another presently preferred implementation of a method for making beverage ice according to another aspect of the invention.

Another presently preferred implementation of a method for making beverage ice according to an aspect of the invention will now be described. A schematic of an equipment layout 60 for providing this preferred implementation is shown in FIG. 12. With reference to that figure, the layout comprises a core section 62, a first active layer section 64, and a second active layer section 66. As will be appreciated from the disclosure herein, one may configure this layout with a third layer section, a fourth, and so on, e.g., by applying the same configuration as the first and second layers by extension.

Core section 62 comprises an ice cube forming device such as a tray 68 comprising a plurality of wells 70, wherein each well is used to form a single ice cube, i.e., core 12. The design of core section tray 68 may be according to known designs for commercially-available ice making machines. A liquid dispensing source 72 runs water into the core section tray 68, the tray and its immediate surroundings are refrigerated so that the temperature drops to the freezing point of water (0° C. for pure water at one atmosphere of pressure) or below, whereupon a "core" ice cube is formed in each of the wells 70 of tray 68.

When the core ice cubes 12 in tray 68 are sufficiently frozen and reach a desired temperature, they are dropped onto a tray 74 of first active layer section 64. This may be accomplished by opening movable doors in the bottom of each well of tray essentially identical to doors 56 in FIG. 11 so that the cubes fall out of the wells and onto tray 74. In some instances, it may be necessary or desirable to apply heat to the walls of tray wells, and possibly to the movable doors as well, to detach the cube faces from the walls so they fall freely.

Tray 74 of first active layer section 64 functions as a singulating template that receives the core cubes 12 from tray 68 and singulates them, i.e., places one cube in each well 76 of tray 74.

A first layer liquid dispenser 78 is disposed over the first layer tray 74 and is configured to direct the first aqueous caffeine-containing solution into the wells 76. The core cubes 12 thus are immersed in the first tray wells 76 beneath and within the first aqueous caffeine-containing solution.

The first aqueous caffeine-containing solution according to this illustrative embodiment is an aqueous solution of filtered or purified water, for example, as is commercially available from any of a range of commercial vendors. Caffeine is added to the solution so that it has a concentration of at least 0.4 mg/g and at least twice the caffeine concentration of the core ice.

Once the core cubes 12 are disposed in the first layer tray wells 76, the temperature of the tray wells and their immediately surrounding environment is reduced to at or below the freezing point of the solution. In this illustrative embodiment, the temperature is set at about −10° to −20° C. Freezing point depression caused by the presence of the solute may be taken into account in selecting the temperature of the first layer section, although preferably the temperature is set sufficiently low that such effects are negligible.

As the first solution is held at or below its freezing point, an active layer 14 that embodies caffeine at a concentration corresponding to the caffeine concentration of the first solution will be disposed onto and frozen onto the core cubes 12. Preferably but optionally, this freezing operation may be continued until all of the first solution in the first tray wells is frozen onto the core and thus creates a cube as shown in FIG. 2, but wherein the core is surrounded by a first active layer that is frozen onto the core. Note that the first layer does not necessarily have the same thickness at all locations, e.g., on all faces. This cube, comprising the core and the first layer frozen to the core, is referred to herein below as the "first layer cube."

When the first layer cubes in tray 74 are sufficiently frozen and reach a desired temperature and degree of freezing, they are dropped onto a tray 80 of second active zone section 66. This may be accomplished by opening movable doors in the bottom of each well of tray 74 (essentially identically to doors 56 of FIG. 11) so that the cubes fall out of wells 76 of tray 74 and into corresponding wells 82 of tray 80. In some instances, it may be necessary or desirable to apply heat to the walls of tray wells, and possibly to the movable doors as well, to detach the cube faces from the walls so they fall freely onto tray 80.

Tray 80 of second active layer section 66 also functions as a singulating template similar or identical in design and function to singulating template 48 that receives the first layer cubes from tray 74 and singulates them, i.e., places one cube in each well 82 of the template.

Once tray 80 is filled with one first layer cube in each well 82, a second layer liquid dispenser 84 disposed at the second layer tray 80 directs a second aqueous caffeine-containing solution into the wells 82. The first layer cubes thus are immersed in the second tray wells beneath and within the second aqueous caffeine-containing solution.

The second aqueous caffeine-containing solution may have a caffeine concentration that is greater than or less than the first aqueous caffeine-containing solution, depending on the caffeine concentration profile desired in the final ice cubes. The second aqueous caffeine-containing solution according to this illustrative embodiment is an aqueous solution of filtered or purified water, for example, as is commercially available from any of a range of commercial vendors, which includes caffeine in solution in a concentration of at least 0.4 mg/g and at least twice the caffeine concentration of the core ice.

Once the cubes and the second aqueous solution are disposed in the second layer tray wells 82, the temperature of the tray wells and their immediately surrounding environment is reduced to at or below the freezing point of the second solution. In this illustrative embodiment, the temperature is set at about −10° to −20° C. Freezing point depression caused by the presence of the solute may be taken into account in selecting the temperature of the second layer section, although preferably the temperature is set sufficiently low that such affects are negligible.

As the second solution is held at or below its freezing point, an active layer that embodies caffeine at a concentration corresponding to the caffeine concentration of the second solution will be disposed onto and frozen onto the surface of the first layer. Preferably but optionally, this freezing operation may be continued until all of the second solution in the second tray wells is frozen onto the first layer cube and thus creates a cube as shown in FIG. 2, wherein the cube includes a core, but wherein the core is surrounded by a first active layer frozen onto the core, and which in turn is surrounded by a second active layer having a caffeine concentration. Note that in these cubes as well the first layer does not necessarily have the same thickness at all locations, e.g., on all faces.

If additional layers are desired, so that the caffeine concentration of a given layer differs from that of its adjacent layers, this process may be repeated as described herein above.

Another preferred method implementation for making beverage ice will now be described with reference to FIG. 13.

In this method implementation, the aqueous caffeine-containing solution is dripped onto the core using a number of different designs or configurations. They preferably involve slowly applying relatively small amounts of the aqueous caffeine-containing solution to the surface of the cube so that the solution is frozen to the surface. One may use a solution having fixed concentration of caffeine, so that a substantially uniform concentration of active layer is disposed on the cube. Alternatively, one may vary the concentration of the caffeine in the solution so that non-constant caffeine concentration profiles are obtained.

As shown in FIG. 13A, a tray 90 is provided that includes a plurality of wells 92. Each well includes a plurality of stanchions 94 that are sized and positioned to support a core 12, and are sufficiently large to accommodate a complete cube as is yielded by the method as described herein. Initially, a core 12 is placed in each well 92 of tray 90, so that it rests upon the stanchions 94. A drip mechanism 96 (FIG. 13B) is positioned over the core, and is used to drop an aqueous caffeine-containing solution onto the core or cube. The solution preferably is chilled to near its freezing point so that melting of the core or cube is avoided as the solution is dripped onto the top surface of the cube. The wells and the environment immediately around the tray are maintained at a desired temperature at or below the freezing point of the solution, and preferably well below that freezing point, e.g., at −10° to −20° C., to cause the solution to freeze onto the exterior surface of the cube as it is dripped. The drip rate can be set in conjunction with the temperature so that the solution is frozen only to the top face, or at a higher flow rate so that the solution extends over the top surface of the cube and runs onto the side faces or surfaces of the cube, and so on. The dripping may be continuous or intermittent.

The mass or volumetric flow rate could be increased to the point that rather than dripping there is an uninterrupted flow of liquid to the cube. Flow rate may be controlled by aperture or tubing size or use of a diffuser head providing smooth flow of liquid onto the cube in a timed or metered process which avoids accumulating an unacceptable amount of overflow. One can create a "staged" flow system in which chilled solution is flowed over a first cube or row of cubes, with the excess then sequentially flowed over a second row, and so on. This would take advantage of the fact that the solution is already chilled (thus saving time, energy and cost), and it might allow one to increase or even maximize the active zone deposition rate.

Another preferred method implementation for making beverage ice will now be described with reference to FIG. 14. In this method implementation, an ice core is sprayed with an aqueous caffeine-containing solution, and the aqueous caffeine-containing solution is frozen onto the core.

Figure 14:
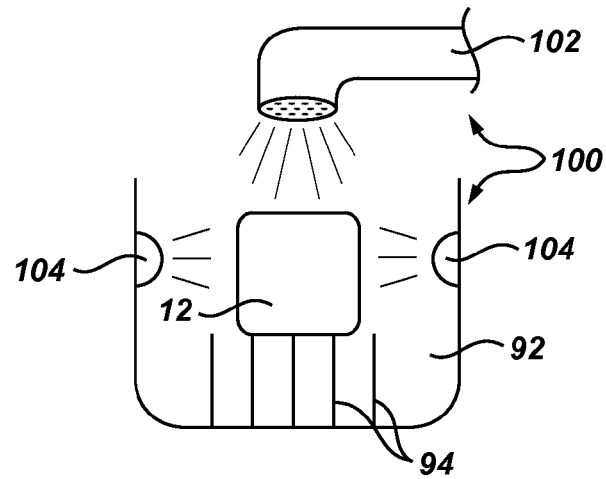
FIG. 14 is a schematic diagram illustrating another presently preferred implementation of a method for making beverage ice according to another aspect of the invention.

As shown in FIG. 14, a tray identical to tray 90 is provided that includes a plurality of wells identical to wells 92. Each well includes a plurality of stanchions 94 that are sized and positioned to support a core, and are sufficiently large to accommodate a complete cube as is yielded by the method as described herein. Initially, a core 12 is placed in each well 92 of tray 90, so that it rests upon the stanchions 94.

Figure 13:
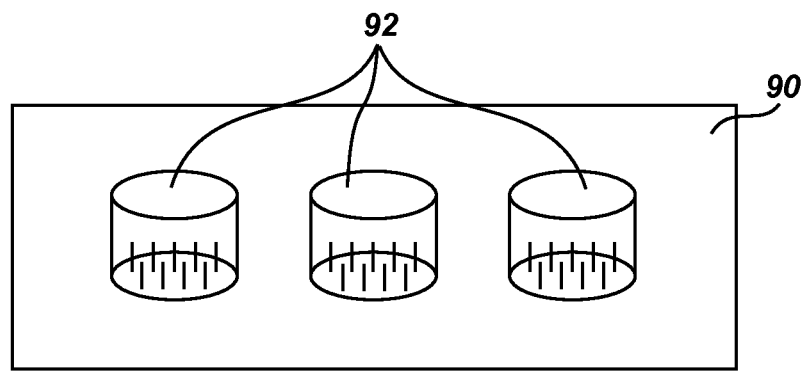
FIG. 13 is a schematic diagram illustrating another presently preferred implementation of a method for making beverage ice according to another aspect of the invention.
Figure 13:
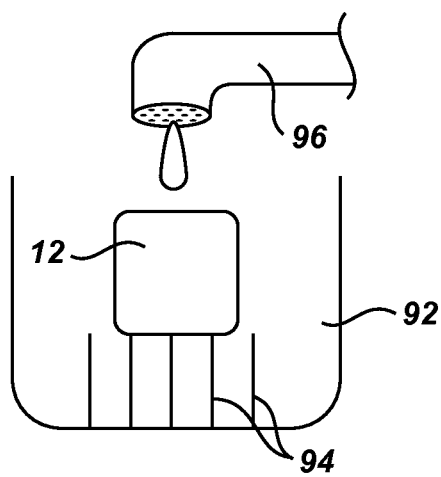

A spray mechanism 100 similar to the drop mechanism of FIG. 13, but with a spray head 102, is positioned over the core 12. Spray heads 104 also are disposed in the side walls of wells 92. Heads 102 and 104 are used to apply an aqueous caffeine-containing solution onto the core or cube 12. The solution preferably is chilled to near its freezing point so that melting of the core or cube is avoided as the solution is sprayed onto the top and side surfaces of the cube. The wells and the environment immediately around the tray are maintained at a desired temperature at or below the freezing point of the solution, and preferably well below that freezing point, e.g., at −10° C., to cause the solution to freeze onto the exterior surface of the cube as it is sprayed. The spray rate can be set in conjunction with the temperature so that the solution is frozen only to the top face, or at a higher flow rate so that the solution extends over the top surface of the cube and runs onto the side faces or surfaces of the cube, and so on. The spray may be continuous or intermittent.

In some instances, the tray may hold the ice as it is initially frozen, and then uncover one surface of the ice while the tray holds the ice in place to prevent it from falling. The spray mechanism then sprays the aqueous caffeine-containing solution onto the ice in a uniform or fairly uniform manner. Upon freezing of this solution onto the ice, the tray releases the ice, allowing it to fall away or otherwise be removed.

Figure 15:
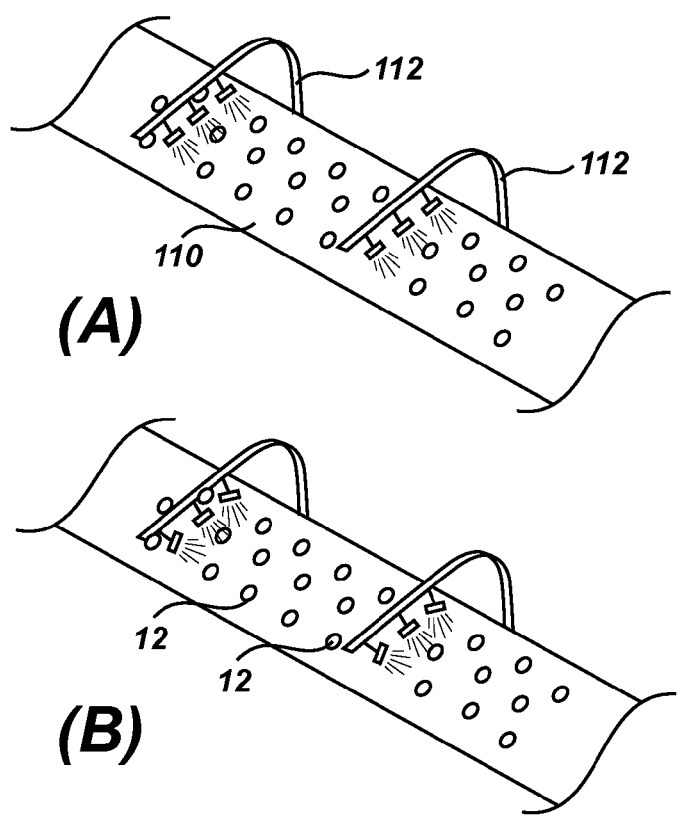
FIG. 15 is a schematic diagram illustrating another presently preferred implementation of a method for making beverage ice according to another aspect of the invention.

An alternative equipment layout for implementing this aspect of the invention is shown in FIG. 15. In it, a conveyor 110 is used to convey ice cores 12, which lie on the conveyor. One or more spray assemblies 112, each of which comprises multiple spray heads, is disposed over the conveyor 110. The spray assemblies are used to spray the chilled aqueous caffeine-containing solution or solutions onto the cubes as they are conveyed under the spray heads. The concentration of caffeine in the spray solution used at the various respective spray assemblies may be uniform, or it may be changed among the various stations. The conveyor may convey the cubes so that the cubes rest on the conveyor and are not turned, as shown in FIG. 15A, in which case only an upper portion of the cube reached by the spray heads is exposed to the solution and thus has an active zone. (See, e.g., FIG. 2.) Alternatively, or in addition, the spray heads may be disposed at an angle with respect to the surface of the conveyor and with respect to one another so that greater angular and geometric coverage can be obtained, for example, as illustrated in FIG. 15B. Also alternatively or in addition, an oscillating or shaking conveyor can be used so that the cubes are bounced and thus dislocated to expose their various surfaces to the spray heads. Yet further, spray may be applied while cubes are falling from a conveyor or mechanism fed by a conveyor.

Additional advantages and modifications will readily occur to those skilled in the art. For example, it will readily occur that spraying of cores need not be performed instantly upon the freezing of the cores. They might be sprayed with aqueous caffeine-containing solution at a later time, such as when falling from a vending machine. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. Ice for use in a beverage, the ice comprising:
    an ice particle comprising a core, an active zone, an external surface, and caffeine, wherein
        the ice particle has a depth from each point of the external surface extending perpendicularly inwards,
        the ice particle comprises a total particle mass,
        the caffeine in the ice particle comprises a total caffeine mass, and
        the ice particle has an ice caffeine concentration equal to the total caffeine mass divided by the total particle mass;
    wherein the active zone comprises at least 40% of the total caffeine mass and local caffeine concentrations within the active zone of at least 150% of the ice caffeine concentration,
        at least 67% of the total caffeine mass is contained within a second depth in millimeters from the external surface no greater than 1.06 times the cube root of the total particle mass in grams, and
        the core has local caffeine concentrations of less than 150% of the ice caffeine concentration.

2. Ice as recited in claim 1, wherein the core comprises one bounded region, and wherein the bounded region is a contiguous region.

3. Ice as recited in claim 1, wherein the core comprises more than one bounded region, and wherein the bounded region is a contiguous region.

4. Ice as recited in claim 1, wherein the core is substantially free of caffeine.

5. Ice as recited in claim 1, wherein the active zone comprises a single bounded region, and wherein the bounded region is a contiguous region.

6. Ice as recited in claim 5, wherein the active zone completely surrounds the core.

7. Ice as recited in claim 5, wherein the active zone surrounds less than all of the core.

8. Ice as recited in claim 1, wherein the active zone comprises at least two bounded regions spaced from one another, and wherein each of the bounded regions is a contiguous region.

9. Ice as recited in claim 1, wherein at least 67% of the total caffeine mass is contained within the second depth, and the second depth in millimeters from the external surface is no greater than 0.69 times the cube root of the total particle mass in grams.

10. Ice as recited in claim 1, wherein at least 67% of the total caffeine mass is contained within the second depth, and the second depth in millimeters from the external surface is no greater than 0.47 times the cube root of the total particle mass in grams.

11. Ice as recited in claim 1, wherein at least 67% of the total caffeine mass is contained within the second depth, and the second depth in millimeters from the external surface is no greater than 0.27 times the cube root of the total particle mass in grams.

12. Ice as recited in claim 1, wherein the ice caffeine concentration is between 0.05 and 10 milligrams of caffeine per gram of the ice particle.

13. Ice as recited in claim 1, wherein the ice caffeine concentration is between 0.1 milligrams and 1 milligram of caffeine per gram of the ice particle.

14. Ice as recited in claim 1, wherein all amounts of ice within a serving mass range contain at least 23 milligrams of caffeine and no more than 300 mg of caffeine.

15. Ice as recited in claim 1, wherein the caffeine comprises at least one of caffeine anhydrous, caffeine monohydrate, micronized caffeine, guarana, and yerba mate.

16. Ice as recited in claim 1, wherein the ice comprises, in addition to as present in the source water, one or more of any nutritionally-acceptable ingredient inclusive of an electrolyte, mineral, food color, flavoring, sweetener, herbal extract, vitamin, amino acid, and glucuronolactone.

17. Ice as recited in claim 1, wherein the active zone and core differ in their concentrations of at least one of an electrolyte, mineral, food color, flavoring, sweetener, herbal extract, vitamin, amino acid, and glucuronolactone.

18. Ice as recited in claim 17, wherein the ice comprises at least one of glucose, sucrose, fructose, sucralose, aspartame, saccharine, acesulfame K, stevia, Luo Han extract, and thaumatin.

19. Ice as recited in claim 18, wherein the active zone and core differ in their concentrations of at least one of glucose, sucrose, fructose, sucralose, aspartame, saccharine, acesulfame K, stevia, Luo Han extract, and thaumatin.

20. Ice as recited in claim 17, wherein the ice comprises at least one of Vitamin B3, Vitamin B6, and Vitamin B12.

21. Ice as recited in claim 17, wherein the active zone and core differ in their concentrations of at least one of Vitamin B3, Vitamin B6, and Vitamin B12.

22. Ice as recited in claim 17, wherein the ice comprises a flavoring selected from at least one of orange, cola, caramel, chocolate, coffee, espresso, mocha, vanilla, green apple, grape, lemon, and lime flavoring.

23. A method for dispensing caffeine into a beverage within a container, the method comprising:
 placing ice into the container, wherein the ice comprises an ice particle comprising a core, an active zone, an external surface, and caffeine, wherein the ice particle has a depth from each point on the external surface extending perpendicularly inwards,
 the ice particle has a total particle mass,
 the caffeine in the ice particle comprises a total caffeine mass, and
 the ice particle has an ice caffeine concentration equal to the total caffeine mass divided by the total particle mass
 wherein the active zone comprises at least 40% of the total caffeine mass and local caffeine concentrations of at least 150% of the ice caffeine concentration,
 at least 67% of the total caffeine mass is contained within a caffeine depth in millimeters from the external surface no greater than 1.06 times the cube root of the total particle mass in grams, and
 the core has local caffeine concentrations less than 150% the ice caffeine concentration; and
 contacting the ice and the beverage with one another within the container so that the ice undergoes melting and at least a portion of the caffeine is dispensed into the beverage as the melting occurs.

24. A method for making beverage ice, the method comprising:
 providing a first aqueous solution optionally comprising caffeine in a first concentration;
 providing a second aqueous solution different from the first aqueous solution comprising caffeine and having a caffeine concentration of at least 0.4 milligrams of caffeine per gram of the second solution and of at least twice the first concentration and;
 providing the first and second aqueous solutions in an alternating fashion at a freezing location and freezing the first and second aqueous solutions to form the beverage ice comprising an ice external surface and caffeine; wherein at least 67% of the caffeine in the ice is within a depth in millimeters from the ice external surface no greater than 1.06 times the cube root of the mass of the ice in grams, and the amount of the caffeine in the ice is at least 0.05 mg of caffeine per gram of the ice.

25. A method for making beverage ice, the method comprising:
 providing an ice core comprising caffeine in a first concentration;
 providing an aqueous caffeine-containing solution having a caffeine concentration of at least 0.4 milligrams of caffeine per gram of the solution and of at least twice the first concentration of caffeine of the core; and disposing and freezing the aqueous caffeine-containing solution onto the core to form the beverage ice; wherein the beverage ice comprises an ice external surface and caffeine, wherein at least 67% of the caffeine in the ice is within a depth in millimeters from the ice external surface no greater than 1.06 times the cube root of the mass of the ice in grams, and the amount of the caffeine in the ice is at least 0.05 mg of caffeine per gram of the ice.

* * * * *